US011240922B2

(12) United States Patent
Van De Sype et al.

(10) Patent No.: US 11,240,922 B2
(45) Date of Patent: Feb. 1, 2022

(54) WALL SYSTEM WITH ELECTRONIC DEVICE MOUNTING ASSEMBLY

(71) Applicant: DIRTT ENVIRONMENTAL SOLUTIONS, INC., Salt Lake City, UT (US)

(72) Inventors: Michael P Van De Sype, Calgary (CA); Colin V Blehm, Calgary (CA)

(73) Assignee: DIRTT ENVIRONMENTAL SOLUTIONS LTD., Calgary (CA)

( * ) Notice: Subject to any disclaimer, the term of this patent is extended or adjusted under 35 U.S.C. 154(b) by 0 days.

(21) Appl. No.: 15/741,180

(22) PCT Filed: Jun. 8, 2017

(86) PCT No.: PCT/US2017/036592
§ 371 (c)(1),
(2) Date: Dec. 29, 2017

(87) PCT Pub. No.: WO2017/214425
PCT Pub. Date: Dec. 14, 2017

(65) Prior Publication Data
US 2018/0199451 A1 Jul. 12, 2018

Related U.S. Application Data

(60) Provisional application No. 62/348,455, filed on Jun. 10, 2016.

(51) Int. Cl.
*H05K 5/00* (2006.01)
*G06F 21/86* (2013.01)
(Continued)

(52) U.S. Cl.
CPC ........... *H05K 5/0073* (2013.01); *F16M 11/22* (2013.01); *F16M 13/00* (2013.01); *F16M 13/02* (2013.01); *G06F 21/86* (2013.01); *H05K 5/0204* (2013.01)

(58) Field of Classification Search
CPC .... H05K 5/0073; H05K 5/0204; F16M 11/00; G06F 21/86
See application file for complete search history.

(56) References Cited

U.S. PATENT DOCUMENTS 2,042,290 A   5/1936  Barrett
2,658,810 A   11/1953 Howard et al.
(Continued)

FOREIGN PATENT DOCUMENTS

CA   248428   3/1925
CA   055086   10/1985
(Continued)

OTHER PUBLICATIONS

Second Search Report and Written Opinion for application No. 11201606345U dated Feb. 13, 2018.
(Continued)

*Primary Examiner* — Abhishek M Rathod
*Assistant Examiner* — Keith DePew
(74) *Attorney, Agent, or Firm* — Workman Nydegger

(57) ABSTRACT

A wall module includes a frame and a tile connected thereto. The tile includes an opening in which an electronic device mounting assembly is mounted. The electronic device mounting assembly includes a mounting plate having a receiving area configured to have an electronic device mounted therein. The electronic device mounting assembly also includes securing elements configured to selectively secure the electronic device within the receiving area and a face plate configured to cover an edge of the opening in the tile as well as a peripheral edge of the electronic device. The wall module having the electronic device mounting assembly described above can be a single wall module within a modular wall having a plurality of wall modules, each of the (Continued)

plurality of wall modules being with or without an electronic device mounting assembly mounted therein.

18 Claims, 10 Drawing Sheets

(51) Int. Cl.
  *F16M 11/22* (2006.01)
  *F16M 13/02* (2006.01)
  *F16M 13/00* (2006.01)
  *H05K 5/02* (2006.01)

(56) References Cited

U.S. PATENT DOCUMENTS

| | | | |
|---|---|---|---|
| 2,676,481 A | 4/1954 | Hoffman | |
| 3,037,593 A | 6/1962 | Webster | |
| 3,088,127 A | 5/1963 | Eames | |
| 3,180,457 A | 4/1965 | Bohnsack | |
| 3,251,169 A | 5/1966 | Cornelissen | |
| 3,295,283 A | 1/1967 | Griffith et al. | |
| 3,371,454 A | 3/1968 | Anderson | |
| 3,486,287 A | 12/1969 | Guillon | |
| 3,498,405 A | 3/1970 | Charpentier | |
| 3,521,937 A | 7/1970 | Buhrmaster et al. | |
| 3,602,226 A | 8/1971 | Ericson | |
| 3,603,053 A | 9/1971 | Loghem et al. | |
| 3,621,635 A | 11/1971 | De Lange | |
| 3,646,180 A | 2/1972 | Winnick | |
| 3,675,382 A | 7/1972 | Lickliter et al. | |
| 3,696,569 A | 10/1972 | Didry | |
| 3,751,127 A | 8/1973 | Pospisil et al. | |
| 3,852,148 A | 12/1974 | Pryor | |
| 3,854,269 A | 12/1974 | Hancock | |
| 3,866,364 A | 2/1975 | Pollard | |
| 3,869,198 A | 3/1975 | Ballentine | |
| 3,885,361 A | 5/1975 | De Schutter | |
| 4,027,878 A | 6/1977 | Dadbeh | |
| 4,031,680 A | 6/1977 | Stoakes | |
| 4,052,832 A | 10/1977 | Jungers et al. | |
| 4,065,904 A | 1/1978 | Taylor et al. | |
| 4,101,231 A | 7/1978 | Streib | |
| 4,103,373 A | 8/1978 | Luedtke et al. | |
| 4,128,983 A | 12/1978 | Matsubara | |
| 4,142,342 A | 3/1979 | Jungers et al. | |
| 4,177,101 A | 12/1979 | Evans | |
| 4,277,920 A | 7/1981 | Dixon | |
| 4,337,997 A | 7/1982 | Sadoune | |
| 4,356,672 A | 11/1982 | Beckman et al. | |
| 4,438,614 A | 3/1984 | Raith et al. | |
| 4,449,337 A | 5/1984 | Gzym et al. | |
| 4,493,172 A | 1/1985 | Jones | |
| 4,535,577 A | 8/1985 | Tenser et al. | |
| 4,544,300 A | 10/1985 | Lew et al. | |
| 4,556,598 A | 12/1985 | Bloom | |
| 4,600,975 A | 7/1986 | Roberts | |
| 4,631,881 A | 12/1986 | Charman | |
| 4,648,231 A | 3/1987 | Laroche | |
| 4,652,170 A | 3/1987 | Lew | |
| 4,663,228 A | 5/1987 | Bolton | |
| 4,688,491 A | 8/1987 | Herrera et al. | |
| 4,689,262 A | 8/1987 | Bloom | |
| 4,752,101 A | 6/1988 | Yurchenco et al. | |
| 4,757,657 A | 7/1988 | Mitchell et al. | |
| 4,830,080 A | 5/1989 | Densen | |
| D302,497 S | 8/1989 | Zapf | |
| D309,381 S | 7/1990 | Buhk | |
| D309,382 S | 7/1990 | Buhk | |
| D309,384 S | 7/1990 | Buhk | |
| D309,385 S | 7/1990 | Buhk | |
| D309,386 S | 7/1990 | Buhk | |
| 4,991,365 A | 2/1991 | Jackson | |
| 5,038,539 A | 8/1991 | Kelley et al. | |
| 5,056,285 A | 10/1991 | Frascaroli et al. | |
| D321,801 S | 11/1991 | Friedman | |
| 5,064,247 A | 11/1991 | Clark et al. | |
| 5,067,294 A | 11/1991 | McGowan | |
| 5,067,543 A | 11/1991 | Bove | |
| D323,251 S | 1/1992 | Zapf | |
| 5,086,597 A | 2/1992 | Kelley et al. | |
| D325,309 S | 4/1992 | Worrell | |
| 5,117,599 A | 6/1992 | Voss | |
| 5,125,201 A | 6/1992 | Pieters et al. | |
| D327,794 S | 7/1992 | Zapf | |
| 5,132,681 A * | 7/1992 | Yabe | G06F 1/16 340/3.1 |
| D328,680 S | 8/1992 | Zapf | |
| 5,144,777 A | 9/1992 | Fishel et al. | |
| D330,295 S | 10/1992 | Zapf | |
| 5,155,955 A | 10/1992 | Ball et al. | |
| D330,641 S | 11/1992 | Zapf | |
| D330,643 S | 11/1992 | Zapf | |
| 5,159,793 A | 11/1992 | Deugo et al. | |
| D331,335 S | 12/1992 | Zapf | |
| D331,513 S | 12/1992 | Zapf | |
| 5,171,060 A | 12/1992 | Kaye | |
| 5,172,530 A | 12/1992 | Fishel et al. | |
| 5,184,441 A | 2/1993 | Balfanz, Jr. | |
| 5,204,149 A | 4/1993 | Phenicie et al. | |
| 5,207,037 A | 5/1993 | Giles et al. | |
| 5,218,799 A | 6/1993 | Appino | |
| D337,003 S | 7/1993 | Rowland | |
| 5,227,005 A | 7/1993 | Zodrow et al. | |
| 5,247,773 A | 9/1993 | Weir | |
| 5,301,484 A | 4/1994 | Jansson | |
| 5,309,686 A | 5/1994 | Underwood et al. | |
| 5,321,579 A | 6/1994 | Brown et al. | |
| D348,786 S | 7/1994 | Tolleson et al. | |
| 5,351,452 A | 10/1994 | Gates | |
| 5,352,033 A | 10/1994 | Gresham et al. | |
| 5,394,668 A | 3/1995 | Lim | |
| 5,488,808 A | 2/1996 | Cahill et al. | |
| D371,683 S | 7/1996 | Tolleson et al. | |
| 5,544,593 A | 8/1996 | Canfield et al. | |
| 5,592,794 A | 1/1997 | Tundaun | |
| 5,598,674 A | 2/1997 | Lay | |
| 5,600,926 A | 2/1997 | Ehrlich | |
| 5,601,348 A | 2/1997 | Minkovski | |
| 5,640,297 A | 6/1997 | Labaze | |
| 5,642,593 A | 7/1997 | Shieh | |
| 5,669,314 A | 9/1997 | Grant | |
| 5,685,113 A | 11/1997 | Reuter et al. | |
| 5,740,644 A | 4/1998 | Menchetti | |
| 5,740,650 A | 4/1998 | Seiber et al. | |
| 5,740,744 A | 4/1998 | Nashirozawa et al. | |
| 5,746,035 A | 5/1998 | Seiber et al. | |
| 5,778,612 A | 7/1998 | Kissinger et al. | |
| 5,792,541 A | 8/1998 | Herrera | |
| D397,880 S | 9/1998 | Saul | |
| 5,802,789 A | 9/1998 | Goodman et al. | |
| 5,803,146 A | 9/1998 | Boon | |
| 5,806,261 A | 9/1998 | Huebner et al. | |
| 5,813,178 A | 9/1998 | Edwards | |
| 5,820,991 A | 10/1998 | Cabo | |
| 5,822,935 A | 10/1998 | Mitchell | |
| 5,826,385 A | 10/1998 | Dykstra et al. | |
| 5,836,121 A | 11/1998 | Hofman | |
| 5,839,240 A | 11/1998 | Elsholz et al. | |
| 5,852,904 A | 12/1998 | Yu et al. | |
| 5,860,255 A | 1/1999 | Fishel | |
| 5,864,997 A | 2/1999 | Kelly | |
| 5,870,867 A | 2/1999 | Mitchell | |
| 5,875,596 A | 3/1999 | Muller | |
| 5,881,979 A | 3/1999 | Rozier et al. | |
| 5,913,787 A | 6/1999 | Edwards | |
| 5,931,429 A | 8/1999 | Hellwig et al. | |
| 5,950,386 A | 9/1999 | Shipman et al. | |
| 5,978,988 A | 11/1999 | Burchett | |
| 6,000,180 A * | 12/1999 | Goodman | A47B 83/001 52/238.1 |
| 6,012,258 A | 1/2000 | Brown et al. | |
| 6,029,418 A | 2/2000 | Wright | |
| 6,047,508 A | 4/2000 | Goodman et al. | |
| 6,058,667 A | 5/2000 | MacDonald et al. | |

(56) References Cited

U.S. PATENT DOCUMENTS

| | | | |
|---|---|---|---|
| 6,094,872 A | 8/2000 | Ward et al. |
| 6,112,472 A | 9/2000 | Van et al. |
| 6,122,871 A | 9/2000 | Russell et al. |
| 6,128,877 A | 10/2000 | Goodman et al. |
| 6,131,347 A | 10/2000 | Hornberger |
| 6,134,845 A | 10/2000 | Shipman et al. |
| 6,141,926 A | 11/2000 | Rossiter et al. |
| 6,158,179 A | 12/2000 | Ackerly et al. |
| 6,161,347 A | 12/2000 | Yu et al. |
| 6,189,270 B1 | 2/2001 | Jeffers et al. |
| 6,195,953 B1 | 3/2001 | Gitter et al. |
| 6,223,485 B1 | 5/2001 | Beck et al. |
| 6,250,020 B1 | 6/2001 | Shipman |
| 6,250,032 B1 | 6/2001 | Davis et al. |
| 6,260,321 B1 | 7/2001 | Rudduck |
| 6,282,854 B1 | 9/2001 | Vos et al. |
| 6,295,764 B1 | 10/2001 | Berridge et al. |
| 6,301,846 B1 | 10/2001 | Waalkes et al. |
| 6,311,441 B1 | 11/2001 | Beavers et al. |
| 6,330,773 B1 | 12/2001 | MacDonald et al. |
| 6,341,457 B1 | 1/2002 | Aerts et al. |
| 6,363,663 B1 | 4/2002 | Kane et al. |
| 6,367,215 B1 | 4/2002 | Laing |
| 6,393,782 B1 | 5/2002 | Berridge et al. |
| 6,393,783 B2 | 5/2002 | Emaus et al. |
| 6,397,533 B1 | 6/2002 | Hornberger et al. |
| 6,397,537 B2 | 6/2002 | Auer et al. |
| 6,415,567 B1 | 7/2002 | Mead et al. |
| 6,446,396 B1 * | 9/2002 | Marangoni .......... A47B 96/027 108/50.02 |
| 6,446,404 B1 | 9/2002 | Bassin |
| 6,481,168 B1 | 11/2002 | Hodges et al. |
| 6,484,465 B2 | 11/2002 | Higgins |
| 6,490,154 B2 | 12/2002 | Thompson |
| 6,497,075 B1 | 12/2002 | Schreiner et al. |
| 6,530,181 B1 | 3/2003 | Seiber et al. |
| 6,536,175 B2 | 3/2003 | Conterno |
| 6,557,310 B2 | 5/2003 | Marshall et al. |
| 6,571,856 B1 | 6/2003 | Goldsmith et al. |
| 6,581,344 B1 | 6/2003 | Niewiadomski et al. |
| 6,591,563 B2 | 7/2003 | King et al. |
| 6,612,077 B2 | 9/2003 | Parshad |
| 6,615,556 B2 | 9/2003 | Cates et al. |
| 6,619,008 B1 | 9/2003 | Shivak et al. |
| 6,658,805 B1 | 12/2003 | Yu et al. |
| 6,668,514 B2 | 12/2003 | Skov |
| D485,096 S | 1/2004 | Overthun et al. |
| 6,684,929 B2 | 2/2004 | MacDonald et al. |
| 6,688,056 B2 | 2/2004 | Von et al. |
| 6,701,677 B2 | 3/2004 | Gresham et al. |
| 6,711,871 B2 | 3/2004 | Beirise et al. |
| 6,729,085 B2 | 5/2004 | Newhouse et al. |
| 6,735,908 B2 | 5/2004 | Edwards |
| 6,748,710 B2 | 6/2004 | Gresham et al. |
| 6,761,004 B2 | 7/2004 | Anglin et al. |
| 6,775,953 B2 | 8/2004 | Burken et al. |
| 6,799,404 B2 | 10/2004 | Spransy |
| 6,807,776 B2 | 10/2004 | Gresham et al. |
| 6,820,388 B2 | 11/2004 | Newhouse et al. |
| 6,851,226 B2 | 2/2005 | MacGregor et al. |
| 6,865,853 B2 | 3/2005 | Burken et al. |
| 6,883,277 B2 | 4/2005 | Wiechecki et al. |
| 6,889,477 B1 | 5/2005 | Kottman |
| 6,920,727 B2 | 7/2005 | Yu et al. |
| 6,928,785 B2 | 8/2005 | Shipman et al. |
| 6,941,716 B2 | 9/2005 | Kottman |
| 6,944,993 B1 | 9/2005 | Jilk et al. |
| 6,951,085 B2 | 10/2005 | Hodges et al. |
| 6,964,138 B2 | 11/2005 | Carroll et al. |
| 6,981,454 B2 | 1/2006 | Burdick |
| 6,990,909 B2 | 1/2006 | Gosling et al. |
| 6,993,875 B2 | 2/2006 | Rudduck |
| 7,051,482 B2 | 5/2006 | MacDonald et al. |
| 7,150,127 B2 | 12/2006 | Underwood et al. |
| 7,210,270 B1 | 5/2007 | King et al. |
| 7,268,311 B2 | 9/2007 | Tanabe |
| 7,310,918 B1 | 12/2007 | Reuter et al. |
| 7,434,790 B1 | 10/2008 | Hansen |
| 7,451,577 B2 | 11/2008 | Little, Jr. |
| 7,461,484 B2 | 12/2008 | Battey et al. |
| 7,540,115 B2 | 6/2009 | Metcalf et al. |
| 7,562,504 B2 | 7/2009 | Herbst et al. |
| 7,603,821 B2 | 10/2009 | Eberlein et al. |
| 7,644,552 B2 | 1/2010 | Kuipers et al. |
| 7,645,954 B2 | 1/2010 | Yasuda |
| 7,661,237 B2 | 2/2010 | Jakob-Bamberg et al. |
| 7,707,790 B2 | 5/2010 | Williams et al. |
| 7,818,932 B2 | 10/2010 | Eberlein et al. |
| 7,827,745 B2 | 11/2010 | Franceschet |
| 7,832,154 B2 | 11/2010 | Gosling et al. |
| 7,841,142 B2 | 11/2010 | Towersey et al. |
| 7,856,777 B2 | 12/2010 | Lamfers et al. |
| 7,861,474 B2 | 1/2011 | Houle et al. |
| 7,887,250 B1 | 2/2011 | Wang |
| 7,891,148 B2 | 2/2011 | Underwood et al. |
| 7,908,805 B2 | 3/2011 | Metcalf et al. |
| 7,913,459 B2 | 3/2011 | Ball et al. |
| 7,918,064 B2 | 4/2011 | Singleton |
| 7,922,224 B2 | 4/2011 | Arias |
| 7,984,598 B2 | 7/2011 | Gosling et al. |
| 8,015,766 B2 | 9/2011 | Gosling et al. |
| 8,015,767 B2 | 9/2011 | Glick et al. |
| 8,024,901 B2 | 9/2011 | Gosling et al. |
| 8,033,059 B2 | 10/2011 | Contois et al. |
| 8,033,068 B2 | 10/2011 | Luettmann et al. |
| 8,046,957 B2 | 11/2011 | Towersey et al. |
| 8,151,527 B2 | 4/2012 | Gosling et al. |
| 8,151,533 B2 | 4/2012 | Krieger |
| 8,176,707 B2 | 5/2012 | Gosling et al. |
| 8,215,061 B2 | 7/2012 | Gosling et al. |
| 8,272,180 B2 | 9/2012 | Glick et al. |
| 8,307,591 B2 | 11/2012 | Steinle et al. |
| 8,322,102 B2 | 12/2012 | Krieger |
| 8,393,122 B2 | 3/2013 | Henriott et al. |
| 8,474,193 B2 | 7/2013 | Sutton et al. |
| 8,479,026 B2 | 7/2013 | Lakshmanan et al. |
| 8,534,021 B2 | 9/2013 | Liu et al. |
| 8,601,749 B2 | 12/2013 | Von et al. |
| 8,613,168 B2 | 12/2013 | Von et al. |
| 8,615,936 B2 | 12/2013 | Von et al. |
| 8,646,739 B2 * | 2/2014 | Moyer ................ H04M 1/04 248/201 |
| 8,656,648 B2 | 2/2014 | Liegeois et al. |
| 8,683,745 B2 | 4/2014 | Artwohl et al. |
| 8,729,446 B2 | 5/2014 | Verfuerth |
| D710,025 S | 7/2014 | Johnson et al. |
| 8,910,435 B2 | 12/2014 | Feldpausch et al. |
| D725,638 S | 3/2015 | Hofman et al. |
| 8,966,839 B2 | 3/2015 | Rebman et al. |
| 9,003,731 B2 | 4/2015 | Gosling et al. |
| D731,833 S | 6/2015 | Fifield et al. |
| 9,084,489 B2 | 7/2015 | Gosling et al. |
| 9,206,600 B2 | 12/2015 | Von et al. |
| 9,284,729 B2 | 3/2016 | Von et al. |
| 9,562,354 B2 | 2/2017 | Strassle et al. |
| 9,673,851 B2 * | 6/2017 | Pelster ................ H04B 1/3888 |
| 9,747,823 B2 * | 8/2017 | Lorenzini ............... G09F 27/00 |
| 9,753,489 B2 * | 9/2017 | Carvey ................. G06F 3/147 |
| 9,880,449 B2 * | 1/2018 | Johnson ................. F16M 13/00 |
| 10,016,056 B2 | 7/2018 | Sklansky |
| 2001/0039774 A1 | 11/2001 | Beirise et al. |
| 2002/0053174 A1 | 5/2002 | Barmak |
| 2002/0104271 A1 | 8/2002 | Gallant |
| 2002/0108330 A1 | 8/2002 | Yu et al. |
| 2002/0121056 A1 | 9/2002 | Von et al. |
| 2002/0124514 A1 | 9/2002 | Higgins |
| 2002/0129574 A1 | 9/2002 | Newhouse et al. |
| 2002/0144476 A1 | 10/2002 | Mastelli |
| 2002/0157335 A1 | 10/2002 | Vos |
| 2003/0005514 A1 | 1/2003 | Kunkel |
| 2003/0060080 A1 | 3/2003 | Rees |
| 2003/0089057 A1 | 5/2003 | Wiechecki et al. |
| 2003/0154673 A1 | 8/2003 | MacGregor et al. |
| 2003/0163967 A1 | 9/2003 | Sims |

(56) References Cited

U.S. PATENT DOCUMENTS

| | | | |
|---|---|---|---|
| 2003/0193709 A1 | 10/2003 | Mallya et al. | |
| 2003/0196388 A1 | 10/2003 | Edwards | |
| 2003/0221384 A1 | 12/2003 | Burken et al. | |
| 2004/0010998 A1 | 1/2004 | Turco | |
| 2004/0020137 A1 | 2/2004 | Battey et al. | |
| 2004/0035074 A1 | 2/2004 | Stanescu et al. | |
| 2004/0045225 A1* | 3/2004 | Weiss | E04H 1/125 52/36.1 |
| 2004/0093805 A1 | 5/2004 | Underwood et al. | |
| 2004/0139677 A1 | 7/2004 | Mulas et al. | |
| 2004/0177573 A1 | 9/2004 | Newhouse et al. | |
| 2005/0005527 A1 | 1/2005 | Metcalf et al. | |
| 2005/0086871 A1 | 4/2005 | MacGregor et al. | |
| 2005/0204596 A1* | 9/2005 | Peng | G09F 9/00 40/320 |
| 2006/0042141 A1 | 3/2006 | Hansen et al. | |
| 2006/0048457 A1 | 3/2006 | Yang | |
| 2006/0050063 A1 | 3/2006 | Tanabe | |
| 2006/0052097 A1* | 3/2006 | Struthers | H04H 20/63 455/422.1 |
| 2006/0059806 A1* | 3/2006 | Gosling | E04B 2/7424 52/238.1 |
| 2006/0073272 A1 | 4/2006 | Carel | |
| 2006/0080939 A1* | 4/2006 | Bledsoe | E04F 19/06 52/750 |
| 2006/0097989 A1 | 5/2006 | Ho | |
| 2006/0185276 A1 | 8/2006 | Pai | |
| 2006/0210755 A1 | 9/2006 | Blazek | |
| 2007/0070192 A1* | 3/2007 | Shalam | B60N 2/879 348/61 |
| 2007/0077387 A1 | 4/2007 | Riccobene | |
| 2007/0242174 A1* | 10/2007 | Maisuradze | G02F 1/133 349/16 |
| 2007/0277449 A1 | 12/2007 | Burns | |
| 2007/0289225 A1 | 12/2007 | Kern et al. | |
| 2008/0059632 A1 | 3/2008 | Gosling et al. | |
| 2008/0295426 A1 | 12/2008 | Milligan et al. | |
| 2008/0302054 A1 | 12/2008 | Gosling et al. | |
| 2009/0021122 A1 | 1/2009 | Green et al. | |
| 2009/0160796 A1 | 6/2009 | Jiang | |
| 2009/0174998 A1* | 7/2009 | Struthers | H04H 20/63 361/679.41 |
| 2009/0241437 A1 | 10/2009 | Steinle et al. | |
| 2009/0256040 A1* | 10/2009 | Lee | F16M 13/02 248/224.61 |
| 2009/0260311 A1 | 10/2009 | Boyer et al. | |
| 2009/0272056 A1 | 11/2009 | Koupal | |
| 2009/0293406 A1 | 12/2009 | Gosling et al. | |
| 2009/0324962 A1 | 12/2009 | Manetti | |
| 2010/0022998 A1 | 1/2010 | Sugino | |
| 2010/0043142 A1 | 2/2010 | Whitford | |
| 2010/0050548 A1 | 3/2010 | Kevin | |
| 2010/0067969 A1 | 3/2010 | Kang | |
| 2010/0102960 A1 | 4/2010 | Simon et al. | |
| 2010/0138581 A1* | 6/2010 | Bird | H04H 20/62 710/303 |
| 2010/0192511 A1 | 8/2010 | Gosling et al. | |
| 2010/0223857 A1 | 9/2010 | Sutton et al. | |
| 2010/0236173 A1 | 9/2010 | Pacha | |
| 2010/0287858 A1 | 11/2010 | Israeli et al. | |
| 2010/0307086 A1 | 12/2010 | Hibbs | |
| 2011/0197519 A1 | 8/2011 | Henriott et al. | |
| 2012/0033375 A1* | 2/2012 | Madonna | F16M 11/041 361/679.43 |
| 2012/0102844 A1 | 5/2012 | Damo | |
| 2012/0141735 A1 | 6/2012 | Chevallier | |
| 2012/0176776 A1 | 7/2012 | Van Herpen et al. | |
| 2012/0186164 A1 | 7/2012 | Pensi | |
| 2012/0293855 A1 | 11/2012 | Shrivastava et al. | |
| 2012/0317899 A1 | 12/2012 | Von et al. | |
| 2013/0025220 A1 | 1/2013 | Yu et al. | |
| 2013/0094168 A1* | 4/2013 | Jaeger | H05K 5/0204 361/808 |
| 2013/0157493 A1 | 6/2013 | Brown | |
| 2014/0102021 A1 | 4/2014 | Gosling et al. | |
| 2014/0133137 A1 | 5/2014 | Kiss | |
| 2014/0137495 A1 | 5/2014 | Ariza | |
| 2014/0157693 A1 | 6/2014 | Schumacher | |
| 2014/0310873 A1 | 10/2014 | Gosling et al. | |
| 2014/0338272 A1 | 11/2014 | Shiao | |
| 2014/0362050 A1 | 12/2014 | Wilson | |
| 2015/0007516 A1 | 1/2015 | Glick et al. | |
| 2015/0027753 A1 | 1/2015 | Huang et al. | |
| 2015/0029412 A1 | 1/2015 | Kishioka | |
| 2015/0085439 A1* | 3/2015 | Lee | H05K 5/0204 361/679.21 |
| 2015/0118869 A1 | 4/2015 | Brown et al. | |
| 2015/0343884 A1 | 12/2015 | Rousselet | |
| 2015/0354212 A1 | 12/2015 | Von et al. | |
| 2016/0007487 A1* | 1/2016 | Lee | G06F 1/1626 206/45.24 |
| 2016/0032644 A1 | 2/2016 | Geller et al. | |
| 2016/0052241 A1 | 2/2016 | Zhang | |
| 2016/0053485 A1 | 2/2016 | Von et al. | |
| 2016/0071664 A1 | 3/2016 | Cohen | |
| 2016/0168863 A1 | 6/2016 | Kwan et al. | |
| 2016/0211878 A1* | 7/2016 | Pelster | H04M 1/04 |
| 2016/0282983 A1 | 9/2016 | Chang et al. | |
| 2016/0306384 A1* | 10/2016 | Carvey | G06F 1/1607 |
| 2016/0327300 A1* | 11/2016 | Ribbich | F24F 11/30 |
| 2016/0348361 A1 | 12/2016 | Gosling et al. | |
| 2016/0363143 A1* | 12/2016 | Druce | F24F 11/30 |
| 2016/0381259 A1* | 12/2016 | Johnson | F16M 13/04 348/158 |
| 2017/0038896 A1 | 2/2017 | Lee et al. | |
| 2017/0089066 A1 | 3/2017 | Gosling et al. | |
| 2017/0256927 A1* | 9/2017 | Padilla | G06K 7/10336 |
| 2018/0002924 A1 | 1/2018 | Gosling | |
| 2018/0195290 A1 | 7/2018 | Seffer et al. | |
| 2018/0199451 A1 | 7/2018 | Van De Sype et al. | |

FOREIGN PATENT DOCUMENTS

| | | |
|---|---|---|
| CA | 2011977 | 10/1990 |
| CA | 2040822 | 11/1991 |
| CA | 1294107 | 1/1992 |
| CA | 2002674 | 3/1993 |
| CA | 2162300 | 5/1997 |
| CA | 2248428 | 3/2000 |
| CA | 2273631 | 10/2001 |
| CA | 2324050 | 4/2002 |
| CA | 2430163 | 7/2002 |
| CA | 2359165 | 4/2003 |
| CA | 2310869 | 8/2003 |
| CA | 2476368 | 1/2006 |
| CA | 2535213 | 8/2006 |
| CA | 2428593 | 8/2007 |
| CA | 2359547 | 2/2008 |
| CA | 2348060 | 7/2008 |
| CA | 2591176 | 12/2008 |
| CA | 2634407 | 12/2008 |
| CA | 2349964 | 10/2009 |
| CA | 2840843 | 12/2013 |
| CA | 2863783 | 4/2014 |
| CH | 686795 | 6/1996 |
| CN | 201197135 | 2/2009 |
| CN | 202069245 | 12/2011 |
| DE | 1659015 | 11/1971 |
| DE | 2941754 | 4/1981 |
| DE | 3900397 | 7/1990 |
| DE | 4207253 | 9/1993 |
| DE | 9307530 U1 | 4/1994 |
| DE | 29620551 U1 | 3/1997 |
| DE | 69316247 | 7/1998 |
| DE | 19960535 | 6/2001 |
| DE | 202004017808 | 1/2005 |
| DE | 202012103275 | 9/2012 |
| DE | 102012008969 A1 | 11/2013 |
| EP | 0000913 | 3/1979 |
| EP | 0302564 | 2/1989 |
| EP | 378133 | 7/1990 |
| EP | 0443202 | 8/1991 |
| EP | 0557092 | 8/1993 |

(56) References Cited

FOREIGN PATENT DOCUMENTS

| | | |
|---|---|---|
| EP | 0657595 | 6/1995 |
| EP | 0886016 | 12/1998 |
| EP | 0963719 | 12/1999 |
| EP | 1035264 | 9/2000 |
| EP | 1094167 | 4/2001 |
| EP | 2273348 | 1/2011 |
| EP | 2730892 | 5/2014 |
| EP | 2736382 | 6/2014 |
| FR | 1526637 | 5/1968 |
| FR | 2218447 | 9/1974 |
| FR | 2499352 | 8/1982 |
| GB | 1013451 | 12/1965 |
| GB | 1259347 | 1/1972 |
| GB | 1400613 | 7/1975 |
| GB | 2221946 | 2/1990 |
| GB | 2283071 | 4/1995 |
| GB | 2323780 | 7/1998 |
| GB | 2353541 | 2/2001 |
| GB | 2374612 | 10/2002 |
| JP | 03-017333 | 1/1991 |
| JP | 2003-105908 | 4/2003 |
| JP | 2005-064103 A | 3/2005 |
| JP | 2005-155223 | 6/2005 |
| JP | 2006-094977 A | 4/2006 |
| JP | 2006094977 A * | 4/2006 .............. A47G 1/16 |
| KR | 10-2000-0049102 | 7/2000 |
| KR | 10-2007-0077502 | 7/2007 |
| KR | 1020120040541 | 4/2012 |
| KR | 10-1311065 | 9/2013 |
| KR | 10-1311068 | 9/2013 |
| WO | 92/12074 | 7/1992 |
| WO | 92/12300 | 7/1992 |
| WO | 93/15970 | 8/1993 |
| WO | 93/23629 | 11/1993 |
| WO | 94/02695 | 2/1994 |
| WO | 9626336 | 8/1996 |
| WO | 96/33323 | 10/1996 |
| WO | 97/46770 | 12/1997 |
| WO | 98/07357 | 2/1998 |
| WO | 98/16699 | 4/1998 |
| WO | 9816870 | 4/1998 |
| WO | 98/29623 | 7/1998 |
| WO | 98/37292 | 8/1998 |
| WO | 98/51876 | 11/1998 |
| WO | 99/46453 | 9/1999 |
| WO | 99/46455 | 9/1999 |
| WO | 99/46458 | 9/1999 |
| WO | 99/53156 | 10/1999 |
| WO | 99/58780 | 11/1999 |
| WO | 99/63177 | 12/1999 |
| WO | 00/15918 | 3/2000 |
| WO | 00/75440 | 12/2000 |
| WO | 00/75447 | 12/2000 |
| WO | 01/71241 | 9/2001 |
| WO | 02/08851 | 1/2002 |
| WO | 02/52111 | 7/2002 |
| WO | 2002/103129 | 12/2002 |
| WO | 03/71045 | 8/2003 |
| WO | 2003/104581 | 12/2003 |
| WO | 2004114105 | 12/2004 |
| WO | 2006005968 | 1/2006 |
| WO | 2006/127804 | 11/2006 |
| WO | 2006123335 | 11/2006 |
| WO | 2009109538 | 9/2009 |
| WO | 2010/121788 | 10/2010 |
| WO | 2011096580 | 8/2011 |
| WO | 2011/150467 | 12/2011 |
| WO | 2012/173930 | 12/2012 |
| WO | 2013/101298 | 7/2013 |
| WO | 2013/130871 | 9/2013 |
| WO | 2013/185141 | 12/2013 |
| WO | 2013/188211 | 12/2013 |
| WO | 2013/188235 | 12/2013 |
| WO | 2014/039278 | 3/2014 |
| WO | 2014/055883 | 4/2014 |
| WO | 2014132715 | 9/2014 |
| WO | 2015017198 | 2/2015 |
| WO | 2016/059224 A1 | 4/2016 |
| WO | 2016059244 | 4/2016 |
| WO | 20170213960 | 12/2017 |
| WO | 2018009936 | 1/2018 |

OTHER PUBLICATIONS

International Search Report and Written Opinion for application No. PCT/US2016/022634 dated Jul. 6, 2016.
International Search Report on Patentability Chapter I for application No. PCT/US2016/022634 dated Sep. 19, 2017.
International Search Report and Written Opinion for application No. PCT/US2017/041387 dated Oct. 19, 2017.
International Search Report and Written Opinion for application No. PCT/US2017/035520 dated Aug. 18, 2017.
Non-Final Office Action for U.S. Appl. No. 15/038,694 dated Jan. 18, 2018.
European Search Report and Written Opinion for application No. PCT/US2016022634 dated Oct. 23, 2018.
European Office Action for application No. 16765651.1-1002 dated Aug. 8, 2019.
European Search Report for application No. EP17825076 dated Feb. 10, 2020.
Written Opinion for Singapore Application No. 11201800368R dated Feb. 25, 2020.
Non-Final Office Action received for U.S. Appl. No. 15/741,489, dated Oct. 27, 2020, 7 pages.
Singapore Supplementary Examination Report received for Singapore Patent Application No. 11201606345U, dated Dec. 4, 2020, 2 pages.
Achieving the Atkins Aesthetic: Ki's new ThinLine option for its award-winning Genius Architectural Wall flaunts a slimmer figure, [Publication Date Unlisted], Dated Jun. 14, 2004.
Canadian Office Action for Application No. 2,800,414 dated Jul. 15, 2015.
Decision Denying Institution (IPR2015-01690), *Allsteal v. DIRTT Environmental Solutions* dated Jan. 27, 2016.
Declaration of Robert Witti, Exhibit No. 1033 (IPR2015-01691), *Allsteel v. DIRTT Environmental Solutions*, dated Jul. 21, 2016.
Deposition of Joseph J. Beaman, Jr., Exhibit No. 2003 (IPR2015-01691), *Allsteel v. DIRTT Environmental Solutions*, dated Apr. 1, 2016.
European Communication pursuant to Article 94(3) EPC for European Application No. 15751602.2, dated Jul. 7, 2020, 4 pages.
European Communication pursuant to Article 94(3) EPC received for European Patent Application No. 15804050.1, dated Jul. 16, 2020, 5 pages.
European Search Report and Search Opinion Received for EP Application No. 15804050.1, dated Dec. 11, 2017, 7 pages.
European Search Report for PCT/US2012/042314 dated Jan. 29, 2015.
European Supplementary Search Report and Opinion for European Application No. 15752109.7, dated Sep. 27, 2017, 8 pages.
Exhibit 2010 Oral Deposition of Joseph J. Beaman Jr., Ph.D. (IPR2015-01691), *Allsteel v. DIRTI Environmental Solutions*, dated Nov. 18, 2018.
Final Written Decision (IPR2015-01691), *Allsteal v. DIRTT Environmental Solutions* dated Jan. 19, 2017.
Final Written Decision on Remand (IPR2015-01691), *Allsteel v. DIRTT Environmental Solutions*, dated Apr. 22, 2019.
Genius Architectural Walls, [Publication Date Unlisted], Copyright Date 2004 by KI, Document Code KI-00473/HC/IT/PP/504.
International Search Report and Written Opinion for PCT/US2012/041906 dated Jan. 31, 2013.
International Search Report for application No. PCT/US15/015931 dated Apr. 30, 2015.
KI Genius Full-Height Moveable Walls, [Publication Date Unlisted], Copyright Date 2003 by KI, Document Code KI-00506/HC/PP/803.
KI Improves STC Rating on its Genius Architectural Wall and receives ICC approval, [Publication Date Unlisted], dated Feb. 26, 2004.

(56) References Cited

OTHER PUBLICATIONS

Lifespace Environmental Wall Systems, [Publication Date Unlisted], Dated Apr. 1995.
Office Insight, [Publication Date Unlisted], Dated Mar. 23, 2009.
Patent Owner's Preliminary Response for Case No. IPR2015-01690 Dated Nov. 13, 2015.
Patent Owners Response (IPR2015-01691), *Allsteel* v. *DIRTT Environmental Solutions*, dated May 2, 2016.
Patent Owners Response to Petitioners Supplemental Brief Addressing Newly Instituted Claims 8,11,13, and 21-23 IPR2015-01691), *Allsteel* v. *DIRTT Environmental Solutions*, dated Nov. 28, 2018.
Petition for Inter Partes Review of U.S. Pat. No. 8,024,901, IPR2015-01691, filed Aug. 7, 2015.
Press Release~"KI unveils Genius Full Heigth Movable Wall Microsite with new interactive features", Accessed on Aug. 14, 2015 at http://web.archive.org/web/20040506230219/http://www.ki.com/about_press_release.asp?id=49.
SMED International—Lifespace-Technical Information, [Publication Date Unlisted], Dated Jan. 1, 1996.
Supplementary European Search Report for application EP 15752752 dated Nov. 30, 2017.
Teknionaltos—Price and Product Guide Update, [Publication Date Unlisted], Dated Feb. 2002.
U.S. Specifier Guide and Price Book, [Publication Date Unlisted], Dated Jan. 1998.
Decision Granting Institution (IPR2015-01691), *Allsteal* v. *DIRTT Environmental Solutions* dated Feb. 2, 2016.
European Communication pursuant to Article 94(3) EPC for European Application No. 15752109.7, dated Jul. 7, 2020, 5 pages.
European Communication pursuant to Article 94(3) EPC for European Application No. 15752752.4, dated Jul. 7, 2020, 4 pages.
European Search Report for PCT/U.S. Pat. No. 2015015943, dated Sep. 27, 2017.
European Supplementary Search Report and Opinion for European Application No. 15751602.2, dated Dec. 11, 2017, 7 pages.
European Supplementary Search Report and Opinion for European Application No. 15752752.4, dated Dec. 11, 2017, 6 pages.
Expert Declaration of Joseph J. Beaman, Jr., Exhibit No. 1018 (IPR2015-01691), *Allsteel* v. *DIRTT Environmental Solutions*, dated Aug. 5, 2015.
International Search Report and Written Opinion for PCT/US2012/042314 dated Jun. 13, 2012.
Patent Owner's Preliminary Response for Case No. IPR2015-01691 dated Nov. 18, 2015.
Petition for Inter Partes Review of U.S. Pat. No. 8,024,901, IPR2015-01691, filed Aug. 7, 2015.
Petitioners Reply to Patent Owners Responsive Brief (IPR2015-01691), *Allsteel* v. *DIRTT Environmental Solutions*, dated Dec. 12, 2018.
Petitioners Supplemental Brief Addressing Newly Instituted Claims 8,11,13 and 21-23 (IPR2015-01691), *Allsteel* v. *DIRTI Environmental Solutions*, dated Oct. 19, 2018.
Reply Declaration of Joseph J. Beaman, Jr., Exhibit No. 1032 (IPR2015-01691), *Allsteel* v. *DIRTT Environmental Solutions*, dated Jul. 21, 2016.
Reply to Patent Owners Response (IPR2015-01691), *Allsteel* v. *DIRTI Environmental Solutions*, dated Jul. 21, 2016.
Supplemental Declaration of Joseph J. Beaman Jr. (IPR2015-01691), *Allsteel* v. *DIRTT Environmental Solutions*, dated Oct. 19, 2018.
Supplementary Search Report for application EP 15751602 dated Nov. 21, 2017.
Supplementary Search Report for application EP 15804050 dated Nov. 30, 2017.
International Search Report for application No. PCT/US15/34491 dated Sep. 15, 2015.
International Search Report for application No. PCT/US15/15920 dated May 22, 2015.
International Search Report for application No. PCT/US15/015943 dated May 14, 2015.
European Search Report for EP 12800672, dated Oct. 10, 2014.
European Search Report for EP 12800672, dated Oct. 16, 2014.
U.S. Appl. No. 14/657,837, filed Nov. 2, 2015, Final Office Action.
U.S. Appl. No. 15/023,990, filed Sep. 7, 2018, Final Office Action.
U.S. Appl. No. 14/681,874, filed Apr. 15, 2016, Final Office Action.
U.S. Appl. No. 14/305,819, filed Jul. 11, 2017, Non-Final Office Action.
U.S. Appl. No. 14/683,684, filed Apr. 23, 2018, Non-Final Office Action.
U.S. Appl. No. 15/023,990, filed Mar. 6, 2017, Non-Final Office Action.
U.S. Appl. No. 15/026,566, filed Sep. 21, 2017, Non-Final Office Action.
U.S. Appl. No. 14/903,035, filed Feb. 16, 2017, Non-Final Office Action.
U.S. Appl. No. 29/492,776, filed Jan. 21, 2016, Notice of Allowance.
U.S. Appl. No. 14/657,837, filed Apr. 12, 2016, Notice of Allowance.
U.S. Appl. No. 14/683,684, filed Jan. 24, 2020, Notice of Allowance.
U.S. Appl. No. 14/903,035, filed Aug. 14, 2017, Notice of Allowance.
U.S. Appl. No. 15/028,000, filed Jul. 7, 2017, Notice of Allowance.
U.S. Appl. No. 14/032,931, filed Jul. 16, 2015, Office Action.
U.S. Appl. No. 14/681,874, filed Jun. 15, 2016, Non-Final Office Action.
U.S. Appl. No. 15/023,990, filed Mar.15, 2018, Non-Final Office Action.
U.S. Appl. No. 15/177,084, filed Jan. 29, 2018, Non-Final Office Action.
U.S. Appl. No. 15/026,566, filed Sep. 21, 2020, Non-Final Office Action.
U.S. Appl. No. 14/681,874, filed Jul. 23, 2015, Office Action.
U.S. Appl. No. 29/493,280, filed Jan. 21, 2016, Notice of Allowance.
U.S. Appl. No. 15/023,990, filed Oct. 3, 2017, Final Office Action.
U.S. Appl. No. 14/683,684, filed Oct. 5, 2017, Restriction Requirement.
U.S. Appl. No. 14/032,931, filed Jul. 24, 2020, Ex Parte Quayle Action.
International Search Report and Written Opinion received for PCT Patent Application No. PCT/US17/036592, dated Sep. 21, 2017, 9 pages.

\* cited by examiner

WALL SYSTEM WITH ELECTRONIC DEVICE MOUNTING ASSEMBLY

CROSS-REFERENCE TO RELATED APPLICATIONS

The present invention is a 35 U.S.C. § 371 U.S. National Stage of PCT Application No. PCT/US2017/036592, filed Jun. 8, 2017, which claims the benefit of U.S. Patent Application No. 62/348,455, filed on Jun. 10, 2016, and entitled WALL SYSTEM WITH ELECTRONIC DEVICE MOUNTING ASSEMBLY. The entire content of each of the foregoing patent applications is incorporated herein by reference.

BACKGROUND

1. Technical Field

This disclosure relates to systems, methods, and apparatus for modular wall construction and design. More specifically, this disclosure relates to wall systems with mounting assemblies for electronic devices (e.g., tablet computers, mobile phones, flat screen displays, PDAs, and the like.

2. Background and Relevant Art

Wall systems, or dividers as they are sometimes called, are commonly used in home or office environments to separate areas and to give people privacy. Such wall systems are typically formed of multiple walls or wall modules that are connected together to define or separate individual spaces (e.g., rooms, offices, etc.). Commonly, such walls provide a blank, flat outer surface. The outer surfaces of walls are often decorated (e.g., with paint, wallpaper, art, etc.) to enhance the aesthetic appeal of the walls.

In commercial or public settings, walls are also used to display information. For instance, signs are often mounted on walls to provide information, directions, etc. to people in or moving through the space defined by the walls. The information on the signs can become outdated. As a result, the signs have to be replaced when the displayed information becomes outdated. Additionally, such signs have limited versatility since they display fixed, static messages. Some electronic signs have been used on walls to enable the displayed information to be updated as desired. Such electronic signs can be expensive. The expense of such electronic signs can be even more difficult to bear when the signs are only used periodically.

BRIEF SUMMARY

Implementations of the present disclosure comprise systems, methods, and apparatuses for displaying information on walls. In particular, implementations of the present invention comprise wall modules having a mounting assembly for an electronic device (e.g., tablet computers, mobile phones, flat screen displays, PDAs, and the like). The disclosed wall modules can be included within a modular wall or other wall systems. For example, the disclosed wall systems can include a plurality of wall modules, at least one of which includes a mounting assembly for an electronic device. As provided herein, the electronic device can be mounted in the mounting assembly such that the electronic device can be used to convey information to people in the space defined by the wall.

In at least one implementation, an electronic device mounting assembly can be used to mount an electronic device to a wall. The electronic device mounting assembly includes a mounting plate that is connectable to the wall and which includes a receiving area configured to receive an electronic device. The electronic device mounting assembly additionally includes one or more securing elements configured to selectively secure the electronic device within the receiving area of the mounting plate and a face plate selectively connectable to the mounting plate to cover at least a peripheral edge of the electronic device and a portion of the wall.

In some implementations, the wall comprises a modular wall and the mounting plate is connectable to a tile of the modular wall. In some implementations, the electronic device mounting assembly is configured within and secured on all sides by the tile when the mounting plate is connected to the modular wall. In some implementations, the electronic device mounting assembly is configured within and secured on less than all sides (e.g., on two sides or on three sides) by the tile when the mounting plate is connected to the modular wall.

In some implementations, the securing elements of the electronic device mounting assembly comprise one or more spring clips. The one or more spring clips can extend through one or more openings in the mounting plate from a rear surface of the mounting plate into the receiving area. In some implementations, the mounting plate of the electronic device mounting assembly comprises one or more openings to allow for air circulation. In some implementations, the electronic device mounting assembly includes an electrical connector configured to provide one or more of power or data to the electronic device.

In some implementations, the electronic device mounting assembly includes a face plate that is selectively connectable to the mounting plate with one or more attachment elements. The attachment elements can include, for example, one or more magnetic elements attached to one or more of the mounting plate or the face plate.

In some implementations, the electronic device mounting assembly includes a device dock that is selectively connectable to the mounting plate using one or more attachment elements. The attachment elements can include, for example, one or more magnetic elements attached to one or more of the device dock or the mounting plate.

In some implementations, the electronic device mounting assembly includes a device dock that is selectively connectable to the face plate using one or more attachment elements. The attachment elements can include, for example, one or more self-clinching fasteners attached to one or more of the device dock or the face plate.

In another example implementation, a wall module includes one or more vertical brackets, one or more horizontal support members connected to the one or more vertical brackets, and one or more tiles connected to the one or more vertical brackets and/or one or more horizontal support members. At least one of the tiles has an opening formed therein. An electronic device mounting assembly is connected to the at least one tile at the opening. The electronic device mounting assembly includes a mounting plate having a receiving area configured to have an electronic device mounted therein. The electronic device mounting assembly additionally includes one or more securing elements that are configured to selectively secure the electronic device within the receiving area and a face plate that is configured to cover an edge of the opening in the at least one tile and a peripheral edge of electronic device.

In some implementations, the electronic device mounting assembly of the wall module is configured within and secured on all sides by the same tile of the wall module. In some implementations, the electronic device mounting assembly of the wall module is configured within and secured on less than all sides by the same tile (e.g., on two side or on three sides). For example, in some implementations a wall module includes a plurality of tiles. In such an implementation, the electronic device mounting assembly can be configured within an interior region of the wall module (as defined, for example, by the frame of the wall module) and secured on all sides by two or more tiles of the plurality of tiles. In some implementations, the mounting plate is secured to a rear surface of the least one tile.

In some implementations, the face plate is selectively securable to the mounting plate using one or more magnetic elements attached to one or more of the mounting plate or the face plate. In some implementations, the face plate is sized and shaped to accommodate a size of the electronic device or to selectively display a portion of the electronic device.

In some implementations, the wall module comprises an electrical connector configured to provide one or more of power or data to the electronic device.

Additional features and advantages of illustrative and/or exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such illustrative and/or exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations and/or implementations thereof which are illustrated in the appended drawings. Understanding that these drawings depict only typical implementations and/or implementations of the invention and are not therefore to be considered to be limiting of its scope, the invention will be described and explained with additional specificity and detail through the use of the accompanying drawings in which.

DETAILED DESCRIPTION

Figure 1A:
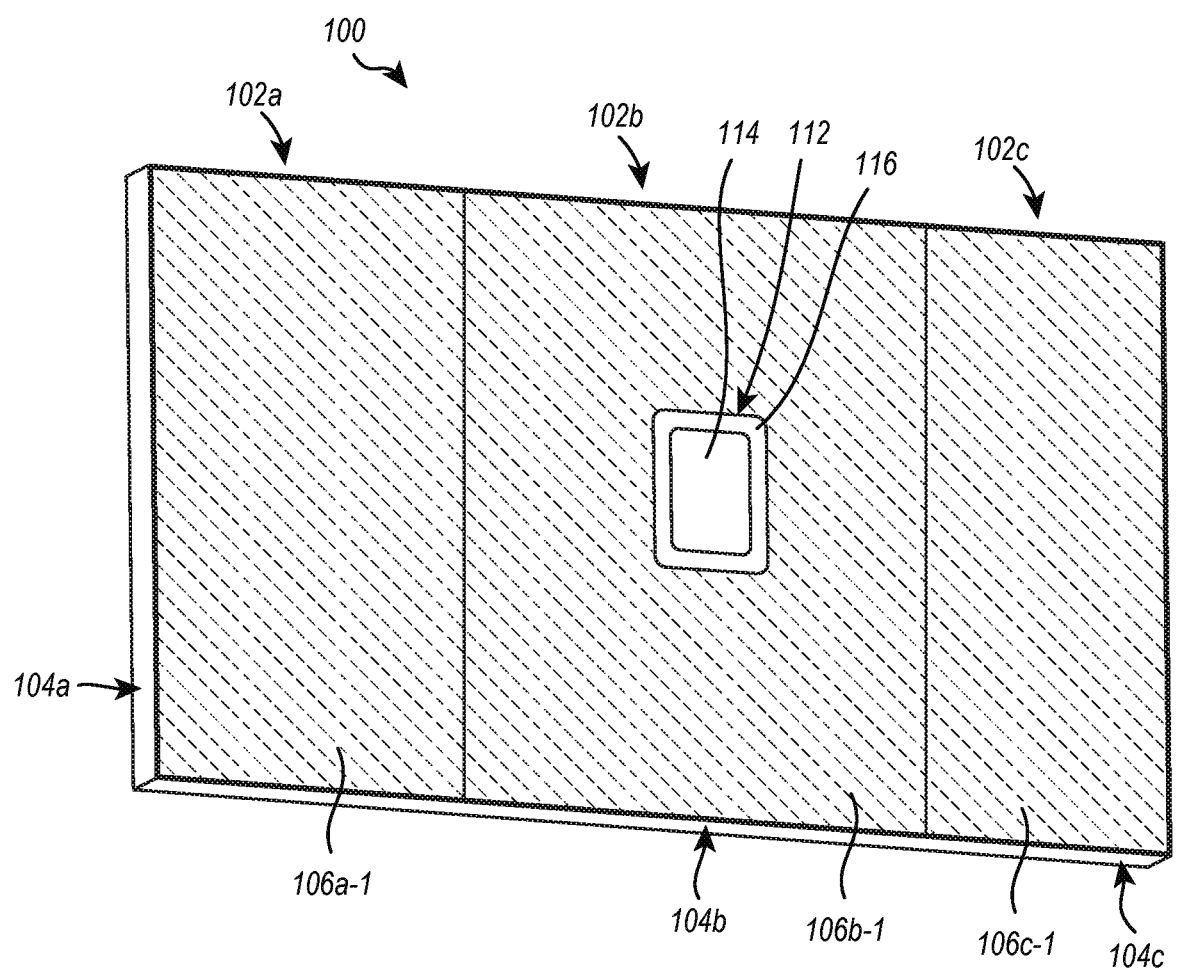
FIG. 1 illustrates a front perspective view of a modular wall system having a mounting assembly with an electronic device mounted therein in accordance with an implementation of the present disclosure.

The present invention extends to systems, methods, and apparatuses for displaying information on walls. In particular, implementations of the present invention comprise wall modules having a mounting assembly for an electronic device (e.g., tablet computers, mobile phones, flat screen displays, PDAs, and the like). The disclosed wall modules can be included within a modular wall or other wall systems. For example, the disclosed wall systems can include a plurality of wall modules, at least one of which includes a mounting assembly for an electronic device. As provided herein, the electronic device can be mounted in the mounting assembly such that the electronic device can be used to convey information to people in the space defined by the wall.

Modular wall systems are particularly useful in dynamic environments such as offices, schools, and other mixed-use areas. Their adaptability for a multitude of uses is what makes them an invaluable tool. In these environments it is likely that modular wall users would intend to use these modular walls as they are accustomed to using traditional walls. These uses include using the wall as a means to display various types of art and information, and more recently as a means to display electronic devices such as televisions and computer monitors. Mounted electronic devices generally require unique support structures and wiring systems. Once these electronics are installed, they are fixed in place and rarely moved. While this semi-permanent style of mounting may suffice for a standard wall, it does not mesh well with the constant rearranging typical to modular wall systems. Modular walls, being that they are temporary movable structures, typically lack the requisite structure necessary to display heavy items. It is particularly difficult to support heavy displays in an aesthetically-pleasing and accessible way.

Additionally, modular walls tend to contain small areas. Many environments, such as work and school environments, require the use of electronics, particularly computers. The workspaces in these areas are usually limited. Therefore, it would be advantageous to mount large items, such as computer monitors, on walls to maximize available work space.

Implementations of the present disclosure include systems, methods, and apparatus for displaying information on walls. The disclosed wall systems can include a mounting assembly for an electronic device (e.g., tablet computer, mobile phone, flat screen display, PDA, and the like). The electronic device can be mounted in the mounting assembly such that the electronic device can be used to convey information to people in the space defined by the wall. The electronic device can be selectively removed from the mounting assembly when it is not needed to convey information in the area defined by the wall.

For example, implementations of the present disclosure enable modular wall systems that include one or more wall modules having an electronic device mounted within an associated mounting assembly. These modular wall systems can be connected together to define or separate individual spaces within a home or office setting (e.g., rooms, offices, etc.). In an office setting, for example, wall systems of the present disclosure can be used to cordon off workspaces. Each workspace can include an electronic device mounted within mounting assembly that is associated with one of the wall modules defining the workspace. The electronic devices can be used, for example, to provide instruction to individuals within the workspace or to convey other information. In an exemplary implementation, the electronic devices can systematically convey emergency information such as a fire alarm. Instead of, or in addition to, an audible siren sounding the fire alarm, the electronic devices can provide information and/or directions to a nearest exit, the location of the fire, and/or a safe area. As an additional example, an amber alert (or similar notification regarding a missing child) can be systematically displayed on the electronic devices to more quickly enable dissemination of critical information (e.g., the child's name, a description of physical features, a photograph, etc.) that can increase the likelihood of finding and/or rescuing the missing child.

An additional exemplary implementation includes displaying a company-wide or department-wide notification such as a new operating procedure or activity. The electronic device can be enabled for displaying videos that can complement the notification, such as, for example, a tutorial related to the new operating procedure. Additionally, or alternatively, the motivational message, image, and/or video can be sent and displayed to an individual or subset of electronic devices to increase productivity or morale. In some implementations, the electronic device can be accessed by an individual user within the workspace to display desired information such as a to-do list, a protocol, or other information related to the user's occupation. Additionally, or alternatively, the electronic device can be used to display personal information such as family photographs or a personal calendar.

It should be appreciated that the foregoing implementations are exemplary in nature and simply illustrate the versatility of having an electronic device disposed on a wall, and when utilized on a modular wall, there are additional advantages to such a system. For example, the electronic device can be moved between modular walls, depending on need, aesthetics, or for any reason or no reason at all. As described below, implementations of the present disclosure include mounting assemblies positioned and held within a tile of the modular wall. Accordingly, an electronic device can be mounted at practically any location within the tile, and in some implementations, relocating and/or repositioning the electronic device on a wall module can include cutting a replacement tile at the repositioned location, installing the mounting assembly at the repositioned location, and exchanging the replacement tile on the modular wall. Additionally, or alternatively, tiles can be switched between wall modules of the modular wall to relocate a mounting assembly having an electronic device. This can be done quickly and inexpensively, as opposed to preexisting wall structures, where relocating a mounting assembly disposed therein would call for significant repairs or alterations to the preexisting wall that are both expensive and time consuming.

Figure 2:
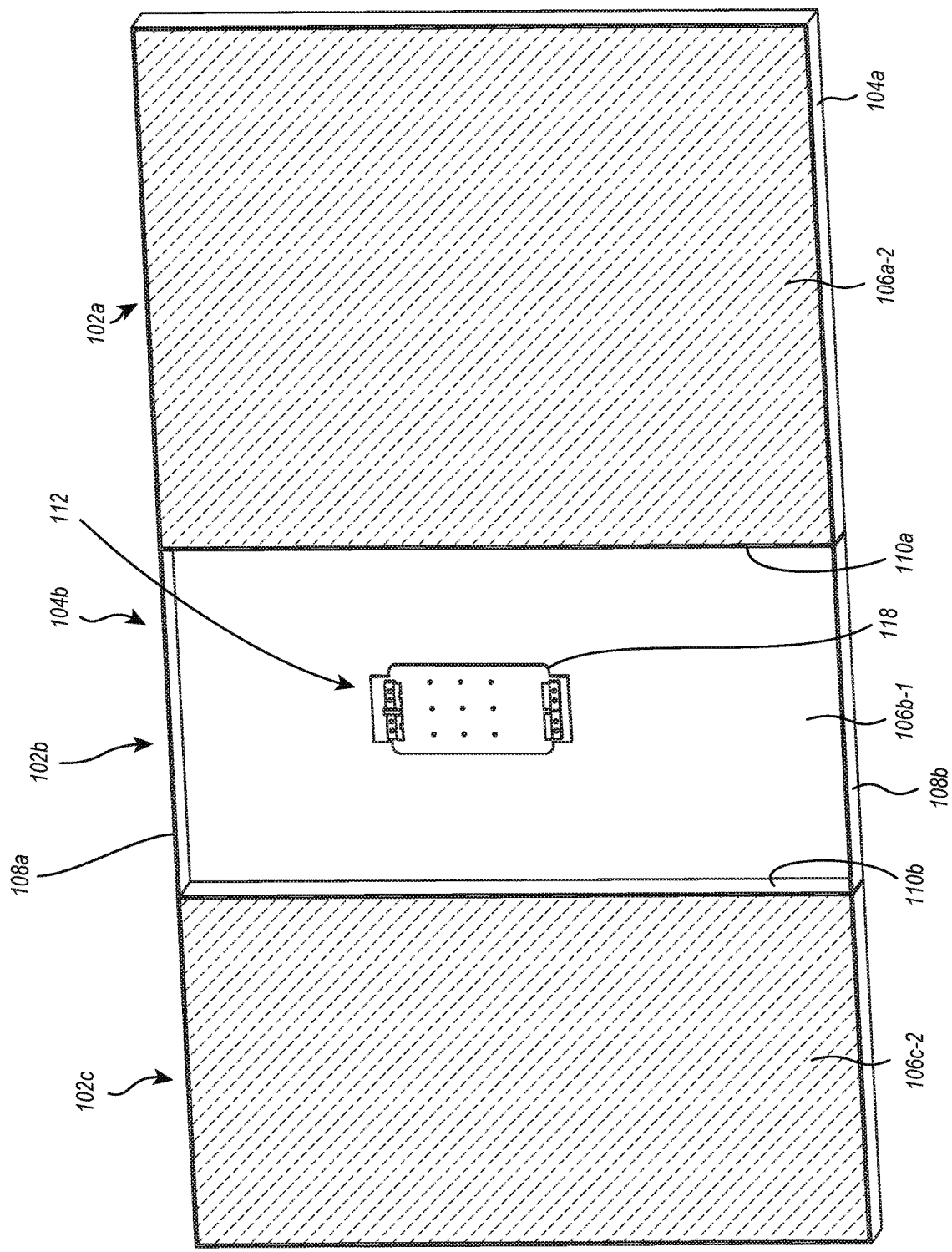
FIG. 2 illustrates a rear perspective view of the modular wall system and electronic device mounting assembly of FIG. 1.

Referring now to the figures, FIGS. 1A and 2 illustrate a modular wall 100 according to an implementation of the present disclosure. FIG. 1 illustrates a front perspective view of the modular wall 100, and FIG. 2 illustrates a rear perspective view of the modular wall 100 of FIG. 1. As shown in FIGS. 1 and 2, the modular wall 100 is formed of three wall modules 102a, 102b, 102c; however, modular wall 100 can include fewer or more wall modules and can be assembled in other configurations than the planar wall shown in these exemplary figures. Each of the wall modules 102a, 102b, 102c includes a frame 104a, 104b, 104c, respectively, and one or more tiles 106a-1, 106b-1, 106c-1, respectively. For example, as shown in FIGS. 1 and 2, collectively, wall module 102a includes a frame 104a, a front tile 106a-1, and a rear tile 106a-2. Similarly, wall module 102c includes a frame 104c, a front tile 106c-1, and a rear tile 106c-2. FIG. 1 illustrates wall module 102b having a frame 104b and a front tile 106b-1. Although not illustrated in FIG. 2, wall module 102b may also include a rear tile 106b-2. FIG. 2 omits rear tile 106b-2 in order to show the interior of wall module 102b and the back side of front tile 106b-1, among other things.

Each wall module in a modular wall can include a frame having one or more vertical members and/or horizontal brackets. As illustrated in FIG. 2, frame 104b of wall module 102b includes opposing first and second horizontal members 108a, 108b and vertical brackets 110a, 110b connected therebetween. One will appreciate, however, that the present disclosure is not limited to a frame including two vertical brackets and two horizontal support members. For instance, a frame according to certain implementations may include a single vertical bracket, more than two vertical brackets, a single horizontal support member, or more than two horizontal support members depending on the specific structural and/or aesthetic needs of the user. Frames 104a, 104b of wall modules 102a, 102c may be similar or identical to frame 104b. Frames 104a, 104b, 104c may be secured together, such as along adjacent horizontal members 108 so that the wall modules 102a, 102b, 102c form modular wall 100.

Additionally, or alternatively, the tiles of a modular wall may be attached to the front or rear of the frames so as to at least partially conceal the frames and help separate areas into different spaces (e.g., as shown, for example, by tiles 106a-1, 106b-1, 106c-1 with respect to a front side of modular wall 100, connecting to frames 104a, 104b, 104c). The tiles may be formed of various materials including wood, fabric, glass, resin, plastic, ceramic, drywall, particle board, foam (e.g., rigid closed cell foam), or any other suitable material. The tiles may be secured to the frames using any suitable attachment mechanism, such as, for instance, clips forming an interference fit.

As used herein, the term "attachment mechanism" includes any device in one or more pieces that may be used to "attach" two or more components or to "attach" one component to another component. The term "attach" and/or "attachment" may refer to its common dictionary definition where appropriate, but it may contextually refer to particular acts of connecting, associating, affixing, fastening, sticking, joining, or any combination of the foregoing that cause an object to be fixedly or selectively proximate another object. In some implementations, the attachment mechanism may be an integral part of a component, whereas in other implementations, the attachment mechanism may be separate.

An attachment mechanism is to be understood to have any number of movable and/or fixed parts, any of which may be singularly or in combination with one or more components interacting to facilitate attachment. As non-limiting examples, an attachment mechanism may include a mechanism for attaching components using one or more—or a combination of—chemical adhesives (e.g., an epoxy and/or other thermosetting adhesives, glue, cement, paste, tape and/or other pressure-sensitive adhesives, etc.), mechanical fasteners (e.g., threaded fasteners such as a combination of a threaded rod together with a complementary threaded nut, rivets, screws, clamps, buckles, tenon and mortise pairs, hook and loop fasteners, dual lock reclosable fasteners, cable ties, rubber bands, etc.), magnets, vacuums (e.g., suction cups, etc.), and/or interference fittings (e.g., press fittings, friction fittings, etc.). Additionally or alternatively, an attachment mechanism may include any material or element resulting from physically attaching two or more components by crimping, welding, and/or soldering.

In the illustrated implementation of FIGS. 1 and 2, each tile 106a-1, 106a-2, 106b-1, 106c-1, 106c-2 covers an entire side of a corresponding wall module 102a, 102b, 102c, respectively. In some implementations, however, multiple tiles may be used to cover a side of a wall module. For example, a left portion of a wall module can be covered by a first tile with a remaining right portion of the wall module being covered by a second tile—the second tile abutting against the first tile. Similarly, a top portion of a wall module can be covered by a first tile with a remaining bottom portion of the wall module being covered by a second tile—the second tile abutting against the first tile. It should be appreciated that one or more additional tiles can be placed between the first and second tiles of the previously exemplified implementations.

As an additional example, a plurality of tiles can cover a side of a wall module in a quadrant of tiles. The wall module may be defined by left and right vertical members, the left vertical member being opposite the right vertical member, and by top and bottom horizontal brackets, the top horizontal bracket being opposite the bottom horizontal bracket. In the context of such a frame, a first tile can attach to the left portion of the top horizontal bracket and an upper portion of the left vertical member. A second tile can attach to the right portion of the top horizontal bracket and an upper portion of the right vertical member. A third tile can attach to the right portion of the bottom horizontal bracket and a lower portion of the right vertical member. A fourth tile can attach to the left portion of the bottom horizontal bracket and to an upper portion of the left vertical member. The first, second, third, and fourth tiles can be sized and shaped such that a vertex of each tile is adjacent to a vertex of at least two adjacent tiles.

In still other implementations, a single tile may be used to cover a side of multiple wall modules, such that the single tile spans across multiple wall modules.

Figure 3A:
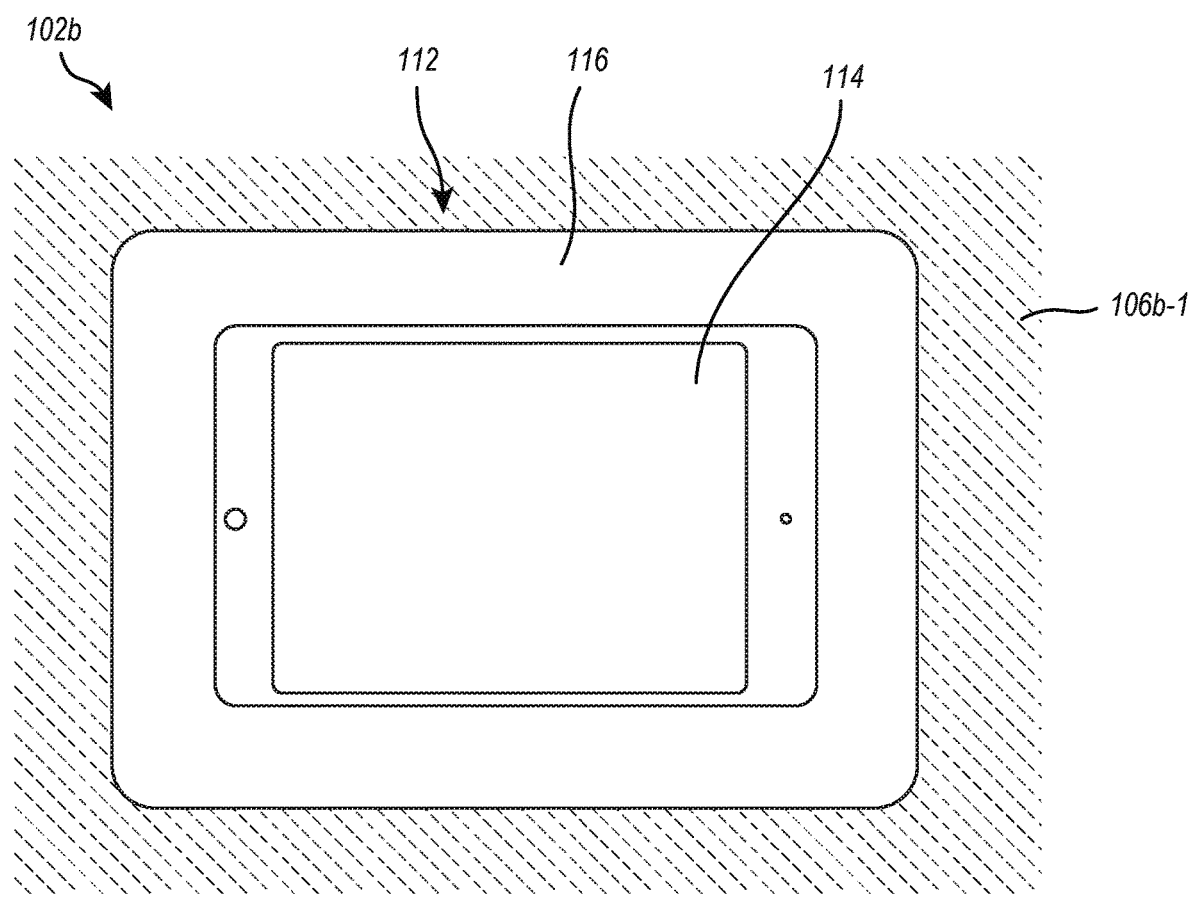
FIG. 3A illustrates a close-up, front profile view of the modular wall system and electronic device mounting assembly of FIG. 1.
Figure 3B:
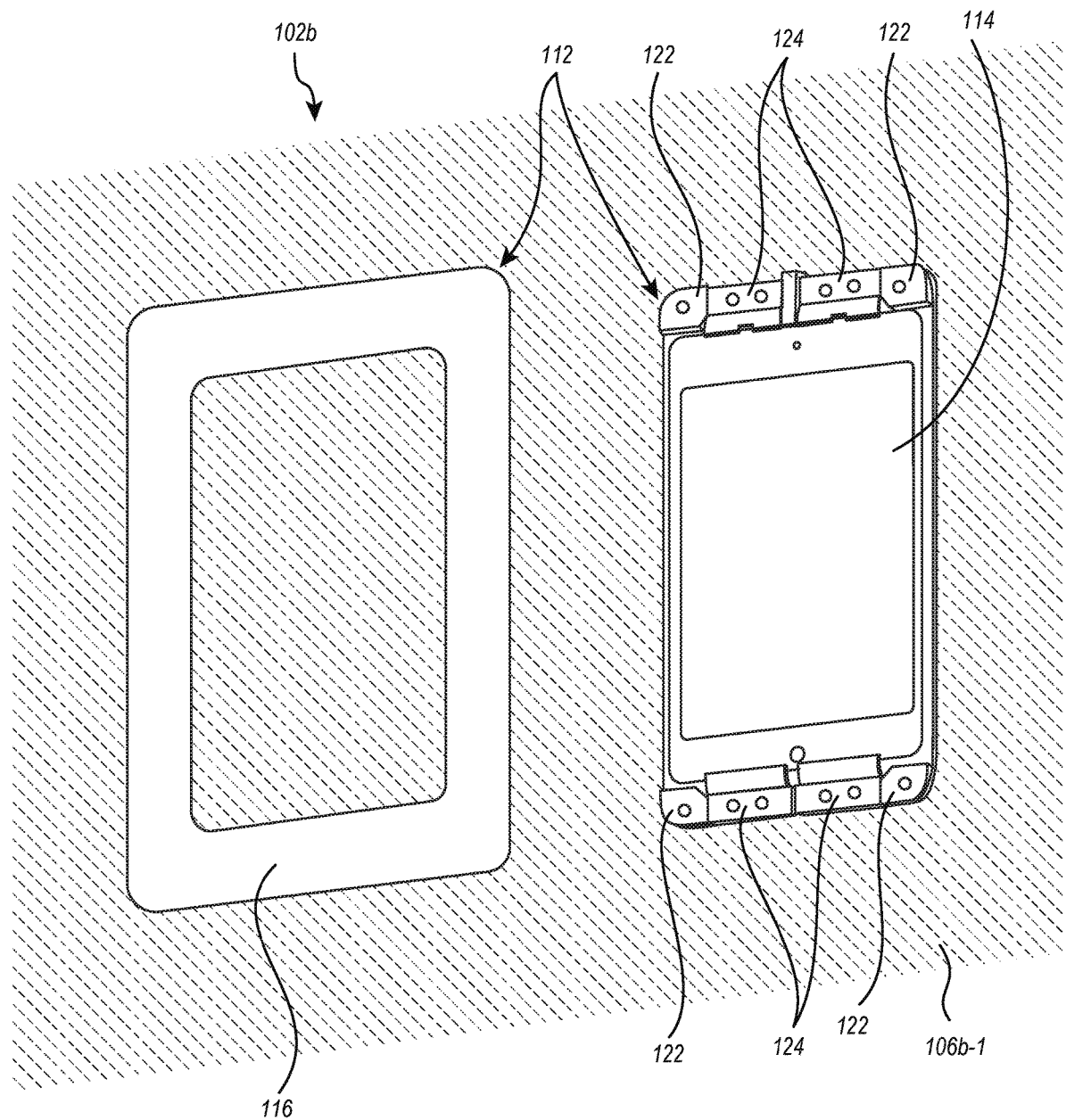
FIG. 3B illustrates a close-up, front perspective view of the electronic device mounting assembly of FIG. 1 with a face plate removed.
Figure 3C:
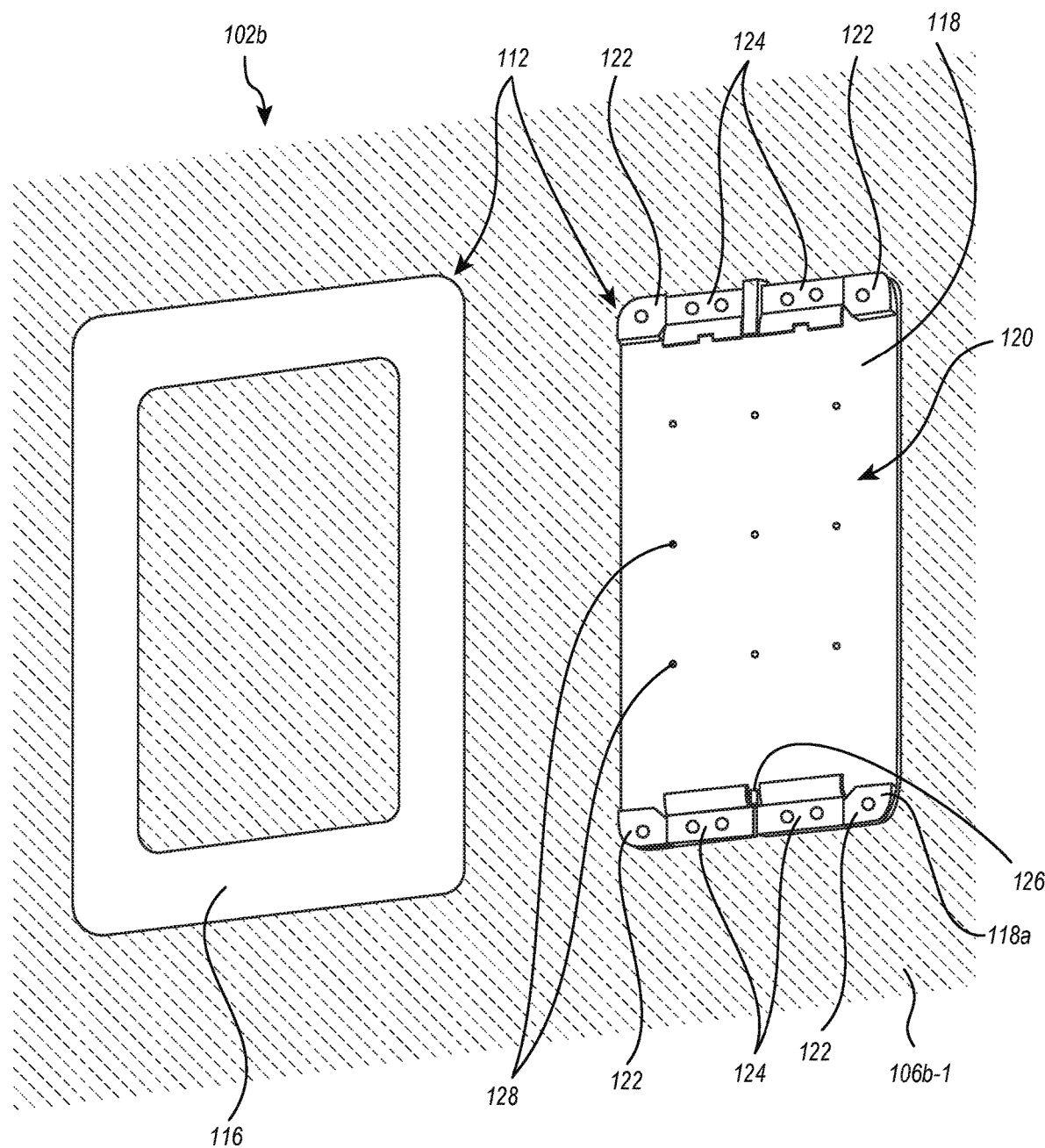
FIG. 3C illustrates a close-up, front perspective view of the electronic device mounting assembly of FIG. 1 with the face plate and electronic device removed.

Referring now to FIGS. 3A-3C, illustrated is a close up view of wall module 102b that includes the mounting assembly 112 with an electronic device 114 selectively mounted within the mounting assembly 112. FIG. 3A illustrates the wall module 102b with the electronic device 114 selectively mounted within the mounting assembly 112 and with a cover 116 associated therewith. In some implementations, the mounting assembly 112 associates with electronic device 114 (as shown in FIG. 3A) and can be used to convey information to individuals near wall module 102b. In some implementations, the mounting assembly can be mounted within an opening formed in tile. This is illustrated, for example, in FIGS. 3A-3C, where the mounting assembly 112 is mounted within an opening in the tile 106b-1. As shown, the mounting assembly 112 is surrounded on all sides by the same tile 106b-1. As can be seen in FIGS. 1A, 1B, 2, and 3A, mounting assembly 112 includes a cover plate 116 that can be used to cover the perimeter of the opening in tile 106b-1 and the peripheral edge of the electronic device 114 to provide an aesthetically pleasing look to the mounting assembly 112 and/or to frame electronic device 114.

As described above, wall modules may include a plurality of tiles. In the examples above, where a wall module included two tiles horizontally or vertically placed with respect to each other, a mounting assembly may span the junction between the tiles, making the mounting assembly secured on all sides by the two tiles. In the example above, where a wall module included a quadrant of tiles, a mounting assembly may span the junction between the four tiles, making the mounting assembly secured on all sides by the four tiles. However, it should be appreciated that in the foregoing implementations, the mounting assembly can be positioned entirely within a single tile of the plurality of tiles associated with the wall module, allowing it to be secured on all sides by the same tile, regardless of the number of tiles used to cover the wall module. For example, in the implementation described above of a wall module having the quadrant of tiles, the first tile (i.e., the tile attaching to the left portion of the top horizontal bracket and to the upper portion of the left vertical member of the wall module frame) can have a mounting assembly disposed therein such that the mounting assembly is secured on all sides by the first file.

It should also be appreciated that in some implementations, the mounting assembly may be secured on at least two sides by the same tile and may be secured on at least one side by a frame of the wall module. For example, a mounting assembly may be secured on one side by a vertical member of the frame or by a horizontal bracket of the frame with the remaining sides being secured by one or more tiles. As an additional example, the mounting assembly may be secured on two sides by the frame (e.g., by vertical numbers on opposite sides of the mounting assembly, but horizontal brackets on opposite sides of the mounting assembly, by the vertical member on a first side of the mounting assembly and a horizontal bracket on a second side of the mounting assembly, etc.) with the remaining sides being secured by one or more tiles. Other configurations having a different number or shape of mounting assemblies and/or tile(s) that encompass the mounting assembly/assemblies or share at least one edge of the mounting assembly with the frame are understood to be within the spirit and scope of the present disclosure.

As shown in FIG. 3A, the mounting assembly 112 secures the electronic device 114 therein. The mounting assembly 112 also allows the electronic device 114 to be selectively removed (as shown and described in FIG. 3C). The electronic device 114 may be selectively removed when not in use displaying information to individuals near modular wall 100, or it may be removed for other reasons. For example, the user may choose to remove the device when leaving the workspace defined by modular wall 100 and return it to the mounting assembly 112 when returning to said workspace. It should be appreciated that the electronic device can be removed from the mounting assembly for any reason or no reason, all of which are considered within the scope of this disclosure.

In some implementations, the electronic device is held within the mounting assembly by a face plate. In other implementations, such as that shown in FIGS. 3A, 3B, and 3C, the electronic device can be removed from the mounting assembly in a sequential manner. For example, as shown in FIG. 3B, the mounting assembly 112 can include a face plate 116 that is removable from the mounting assembly 112, and as shown in FIG. 3C, the electronic device 114 can be removed therefrom after disengaging one or more securing elements 124. As is perhaps best shown in FIG. 3C, the mounting assembly 112 includes a mounting plate 118 which defines at least a portion of a receiving area 120. As shown, the receiving area 120 is sized to receive electronic device 114. In some implementations, and as shown in FIG. 3C, the receiving area 120 may be recessed from a front surface of the mounting plate 118a and may include or be defined on one or more sides by the tile. In some implementations, the recess is sized and shaped to accommodate the electronic device such that the electronic device is flush or substantially level with a front surface of the associated tile when disposed therein.

As shown in FIGS. 3B and 3C, the mounting plate 118 may include or have connected thereto one or more attachment elements 122. The attachment elements 122 may be used to secure the face plate 116 to mounting plate 118. Accordingly, disestablishment of the attachment elements 122 removes the face plate from the mounting assembly 112. In the illustrated implementations of FIGS. 3B and 3C, the attachment elements 122 are or include magnetic elements. Corresponding magnetic elements may be disposed on or formed as part of face plate 116.

In some implementations, the face plate includes one or more ferrous materials such that a magnetic element is placed on the mounting plate and holds the face plate thereto by the magnetic attraction between the magnet disposed on the mounting plate and the ferrous material of the face plate. It should be appreciated that in some implementations, the face plate includes the magnetic elements and the mounting plate includes one or more ferrous materials. In other implementations, neither the face plate nor the mounting plate include ferrous material; instead, magnets are formed into, coupled to, and/or adhered to the face plate and mounting plate in complementary positions such that the magnets will magnetically interact when the face plate is joined or brought within close proximity to the mounting plate. Accordingly, when the face plate is brought into close proximity to mounting plate, the magnetic attachment elements may interact with corresponding magnetic elements on the face plate to secure face plate to mounting plate.

Other implementations may include different forms of the attachment elements, such as clips, adhesives, hook and loop fasteners, and the like. In some implementations, the attachment elements are specifically designed to allow for the face plate to be selectively attached to and removed from the mounting plate in order to allow for the electronic device to be mounted in or removed therefrom.

Mounting assembly 112 also includes one or more securing elements 124 that can be used to selectively secure electronic device 114 within mounting assembly 112. In the illustrated implementations of FIGS. 3B and 3C, securing elements 124 are spring clips mounted to mounting plate 118. As shown, the spring clips 124 extend through one or more openings in the mounting plate 118 from a rear surface of the mounting plate 118b (FIG. 5) into the receiving area 120.

The spring clips 124 may be selectively flexed to allow for insertion of the electronic device 114 into the receiving area 120. Once the electronic device 114 is positioned within receiving area 120, the spring clips 124 can be released and an attachment portion thereof may extend onto a front surface of electronic device 114, as shown in FIG. 3B, to secure the electronic device 114 within mounting assembly 112. Similarly, electronic device 114 can be removed from the mounting assembly 112 by flexing the spring clips 124 away from the electronic device 114 so that the attachment portions of the spring clips 124 do not extend onto the front surface of the electronic device 114. With the spring clips 124 flexed away from the electronic device 114, the electronic device 114 can be removed from the receiving area 120 and mounting assembly 112.

In other implementations, the securing elements 124 may take other forms.

Figure 7:
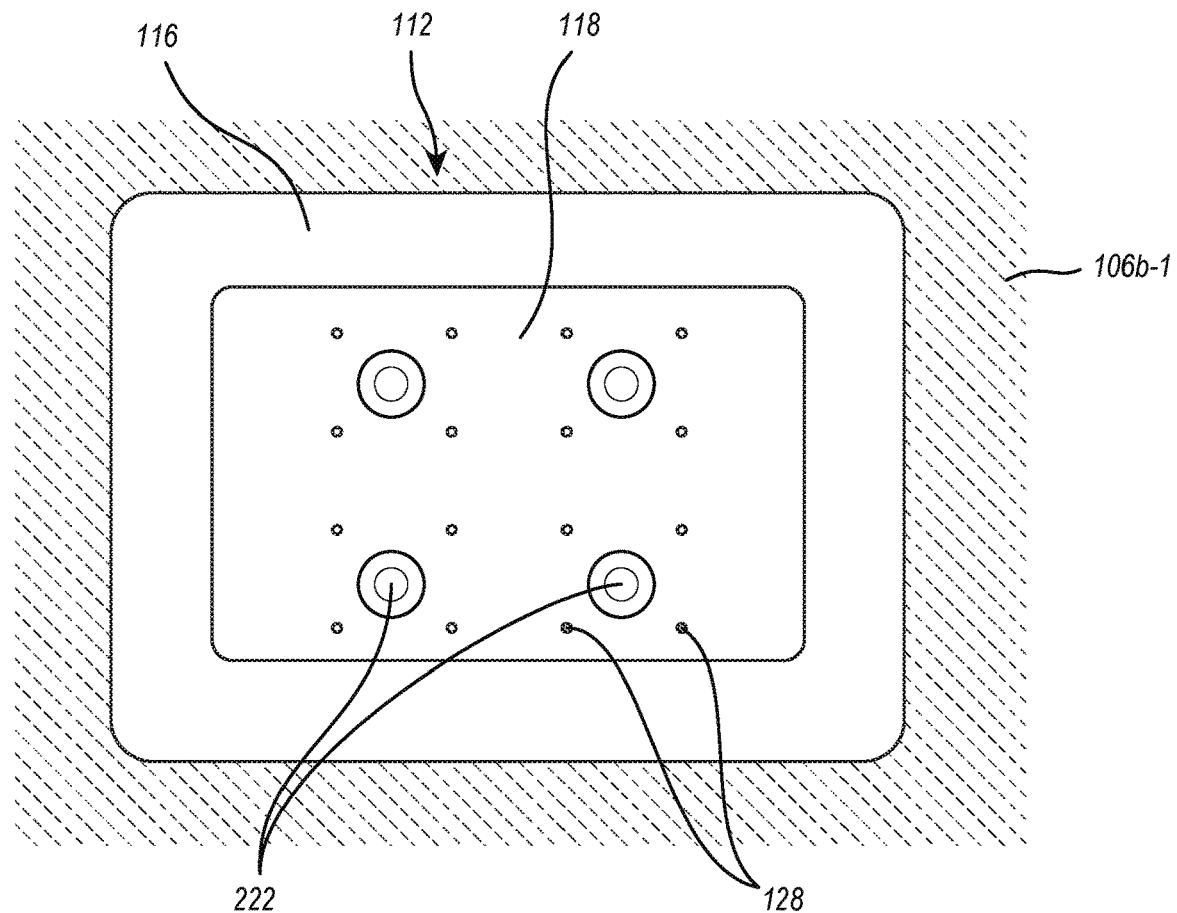
FIG. 7 illustrates a partially assembled electronic device mounting assembly having an alternative mounting mechanism in accordance with an implementation of the present disclosure.

For instance, as shown in FIG. 7, the spring clips of FIGS. 3B and 3C may be replaced or supplemented with one or more suction cups 222. The one or more suction cups 222 may act to secure the electronic device within the receiving area 120 by, for example, creating a partial vacuum between a back surface of electronic device 114 and the suction cup. This, in effect, selectively secures the electronic device 114 within mounting assembly 112. In some implementations, the suction cups are coupled with one or more other securing elements to redundantly, additively, or synergistically act to secure an electronic device within the mounting assembly.

In some implementations, the securing elements may be selectively adjusted to accommodate different types or sizes of electronic devices within mounting assembly. For example, the securing elements can be lengthened or shortened to accommodate a smaller or larger electronic device, respectively (e.g., a table computer vs a smartphone). Additionally, or alternatively, the securing elements can be selectively adjusted within the receiving area (e.g., on slidably adjustable horizontal and vertical spacers). In some implementations, the mounting assembly is constructed in various sizes to accommodate particular types and/or sizes of electronic devices.

Figure 5:
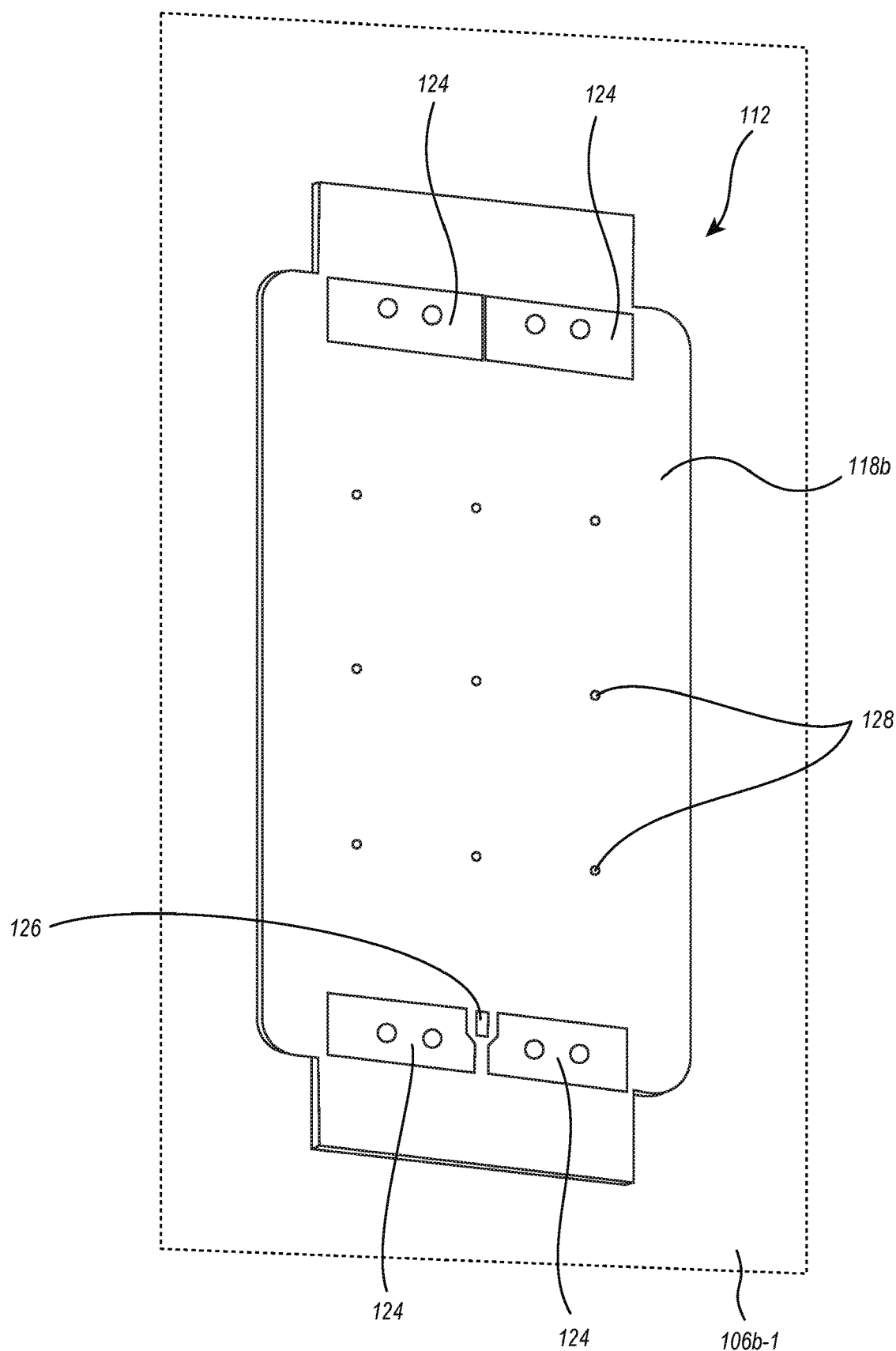
FIG. 5 illustrates a close up perspective view of the modular wall system and electronic device mounting assembly of FIG. 2.

As shown in FIGS. 2 and 5, for example, the mounting assembly 112 includes a mounting plate 118 that is attached to the rear surface of tile 106b-1. Mounting plate 118 may be attached the rear surface of tile 106b-1 using various attachment mechanisms, as that term is understood and defined herein. In some implementations, the mounting plate 118 is not secured to the rear surface with an attachment mechanism. Rather, the mounting plate is secured within an opening of the tile by, for example, an interference fit. In some implementations, the interference fit exists between two or more sides of the mounting plate disposed within the opening and the tile defining the opening. In some implementations, one or more sides of the mounting plate are connected to and/or secured to the frame using one or more attachment mechanisms, or similar to the foregoing implementation, through an interference fit with one or more elements of the frame and/or tile.

Figure 4:
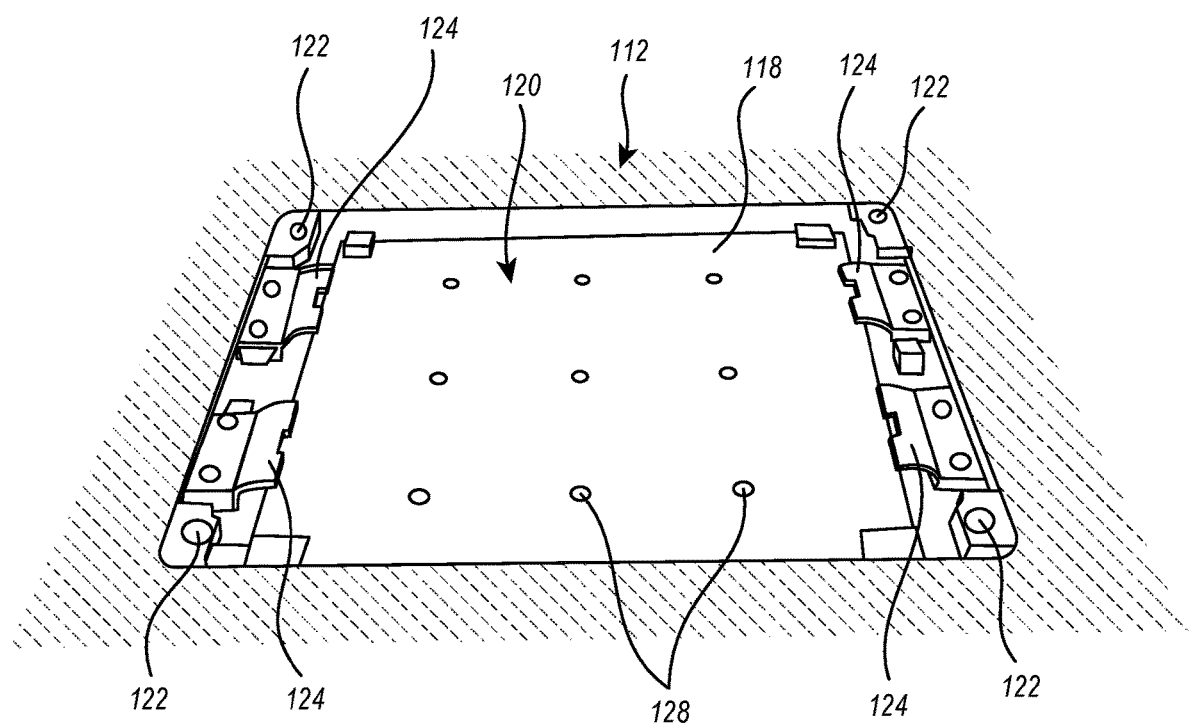
FIG. 4 is a close up perspective view of the electronic device mounting assembly of FIG. 3A with a face plate and electronic device removed.

As shown, for example, in FIGS. 4 and 5, the mounting plate 118 includes one or more vents 128 therethrough. The vents 128 can enable the circulation of air into and out of the mounting assembly 112. Such air circulation can assist in preventing the electronic device from overheating. For instance, heat may be generated from the operation of the electronic device, and the generated heat may escape from the mounting assembly through the vents, thereby preventing the buildup of excessive heat around the electronic device.

As perhaps best shown in FIG. 5, the mounting assembly 112 can also include an electrical connection 126. The electrical connection 126 can include a connector interface that is configured to be received by the electronic device 114 to provide power and/or data to the electronic device 114. In some implementations, the electrical connection can provide data, computer executable instructions, or similar that can, for example, affect the functioning of the electronic device (e.g., what is displayed by the electronic device and/or when content is displayed by the electronic device). In some implementations, the electrical connection can also carry data away from electronic device. As shown in FIG. 5, the electrical connection 126 can be connected to the mounting plate 118 such that the connector interface is readily accessible when an electronic device 114 is being mounted within mounting assembly 112. In some implementations, the electrical connection is fixedly connected to mounting plate, while in other implementations, the electrical connection is movably connected to the mounting plate.

In a similar fashion described above for removing an electronic device from a mounting assembly, an electronic device can be selectively associated with a mounting assembly. For example, it may be desirable to mount an electronic device within a mounting assembly to display information thereon. In an exemplary implementation, an electronic device is mounted within a mounting assembly by, first, removing the face plate from the mounting plate. This can be accomplished by disconnecting the face plate from attachment elements (e.g., by applying a force to the face plate in a direction away from the attachment elements). With the face plate removed, the electronic device can be positioned and secured within the receiving area by flexing one or more spring clips away from the center of the mounting plate, thereby allowing the electronic device to be inserted between opposing spring clips (or between a set of spring clips on a first end and a securing ridge disposed on an opposing second end). Once the electronic device is positioned within the receiving area and between the opposing spring clips, the spring clips can be returned and/or flexed toward the electronic device so that the attachment portions thereof extend over a side and/or front surface of electronic device. Flexing the spring clips toward electronic device can be accomplished simply by removing a counterforce therefrom that was used to flex the spring clips away from electronic device or by actively pressing the spring clips toward and into contact with the electronic device. Once secured thereto, the securing elements can hold the electronic device within the mounting assembly.

It should be appreciated that in the foregoing example, the spring clips can be replaced with (entirely or partially) any other securing element described herein or known in the art.

In some implementations, the electrical connection can be connected to electronic device, either before or after securing it within the receiving area. For instance, the connector interface of the electrical connection can be plugged into a port or receptacle in the electronic device. In some implementations, it may be unnecessary to connect the electronic device to the electrical connection. For instance, if the electronic device has sufficient battery power to operate for the time desired, a power connection provided by an exemplary electrical connection may be unneeded. In other implementations, it may be unnecessary to physically couple/connect the electronic device to an electrical connection because the electrical connection may take the form of a wireless charging pad or a remote charging system which may be mounted within or otherwise in electrical communication with the mounting assembly so as to provide remote power thereto. In some implementations, the electrical connection does not contain a data connection. Rather, the electronic device can receive data communications through a wireless protocol (e.g., Bluetooth or through a wireless area network). Thus, in some implementations, one or more of the power and/or data provided by an electrical connection may be omitted from the mounting assembly.

Once the electronic device is mounted within the receiving area, and optionally connected to electrical connection, the face plate can be secured to the mounting plate via the attachment elements. The electronic device can thereafter be used to display information in the area defined by the associated modular wall. As provided above, such information may be presented in words, pictures, videos, sounds, or combinations thereof. During times when information does not need to be presented in the area proximate the electronic device, the electronic device can be optionally powered down or removed from the mounting assembly so that it may be used for other purposes. In some implementations, therefore, the mounting assembly allows for the use of an electronic display without requiring a dedicated electronic display to be continuously mounted on a wall.

In some implementations, when the electronic device is not mounted within the mounting assembly, the mounting assembly can be left blank with the cover attached thereto. Alternatively, a sign, picture, or the like can be mounted within mounting assembly.

Further, in some implementations, the mounting assembly can include an aesthetic or modified face plate.

Figure 6:
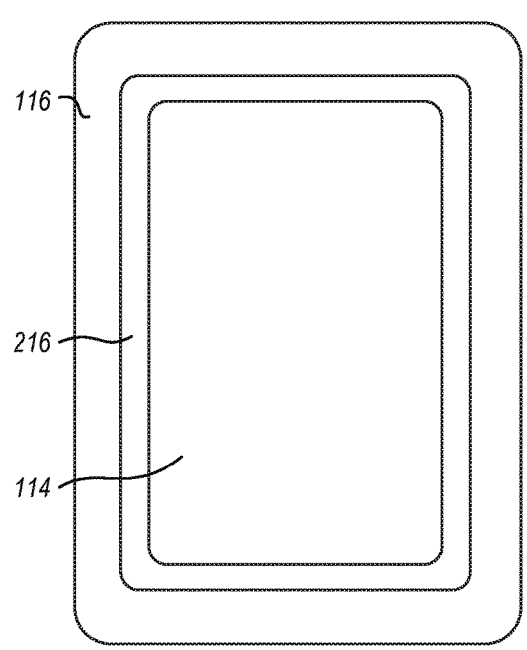
FIG. 6 illustrates a modified face plate in accordance with an implementation of the present disclosure.

For example, exemplary modified and/or aesthetic face plates are shown in FIGS. 6A-6D. As shown, a faceplate may take the form of a variety of customizable designs to suit the environment or mode in which modular wall and mounting assembly are used. The face plate may, for example, be sized to accommodate various sizes of an electronic device. FIG. 6, for example includes a faceplate 116 having a window mat 114 that operably adjusts (e.g., shrinks) the viewable area of the electronic device 114. In some implementations, the window mats are available to accommodate various sizes of electronic devices and/or to manipulate the viewing area thereof.

Figure 6A:
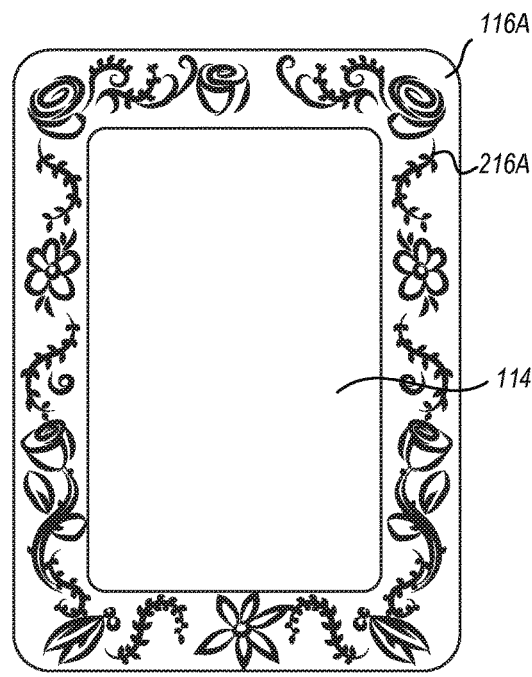
FIG. 6A illustrates an example of a decorative face plate in accordance with an implementation of the present disclosure.
Figure 6B:
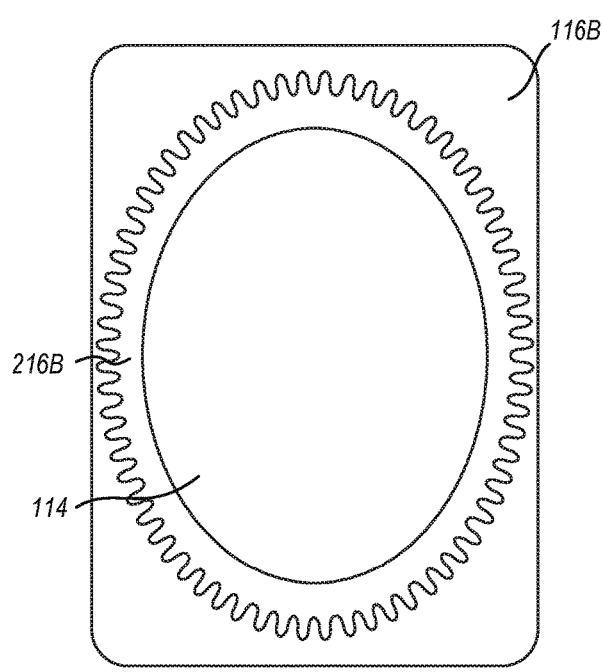
FIG. 6B illustrates an example of a modified and decorative face plate in accordance with an implementation of the present disclosure.
Figure 6C:
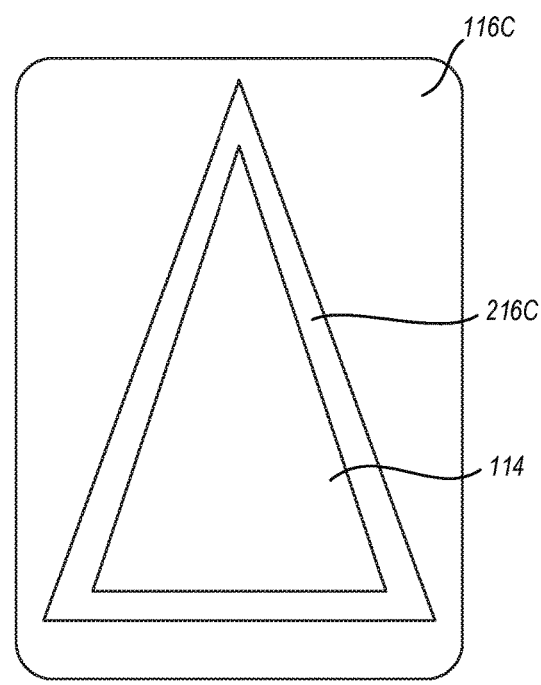
FIG. 6C illustrates another example of a modified face plate in accordance with an implementation of the present disclosure.
Figure 6D:
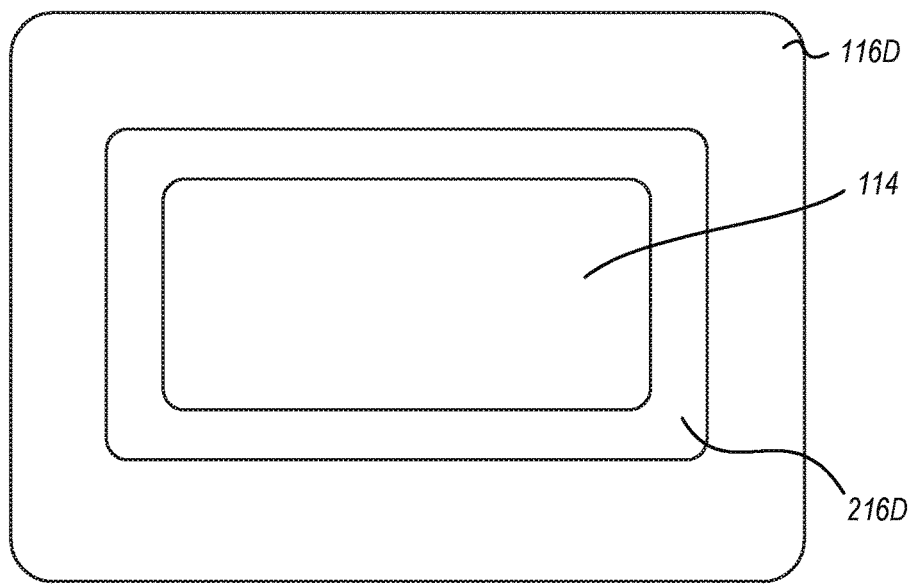
FIG. 6D illustrates another example of a modified face plate in accordance with an implementation of the present disclosure.

FIG. 6A illustrates a face plate 116A having a decorative designs 216A disposed thereon. The decorative designs 216A can be used to provide an additional aesthetic flare to the face plate or to complement the information being displayed thereon. As an additional example, FIG. 6B illustrates a face plate 116B having an elongate and decorative frame portion 216B that can both act to occlude a viewing portion of the electronic device 114 and to provide an aesthetic touch to the face plate 116B. A face plate 116B may be used, for example, in displaying portraits.

As shown in FIGS. 3C and 3D, the face plate can, itself, have a same or similar outer dimension as the other face plates shown in FIGS. 6, 6A, and 6B but it can be designed to show only a particular portion of the electronic device 114 or accommodate a smaller or alternatively shaped display of the electronic device 114. In some implementations, the face plate may also be configured with a type of transparent overlay. This may serve a number of purposes, including, for example, protecting the display of electronic device 114 or the electronic device, itself. Additionally, or alternatively, the transparent overlay can impose an image or effect on the projections from the electronic device (e.g., filtering or enhancing colors, darkening the display, polarizing the light displayed therefrom, etc.).

Figure 8:
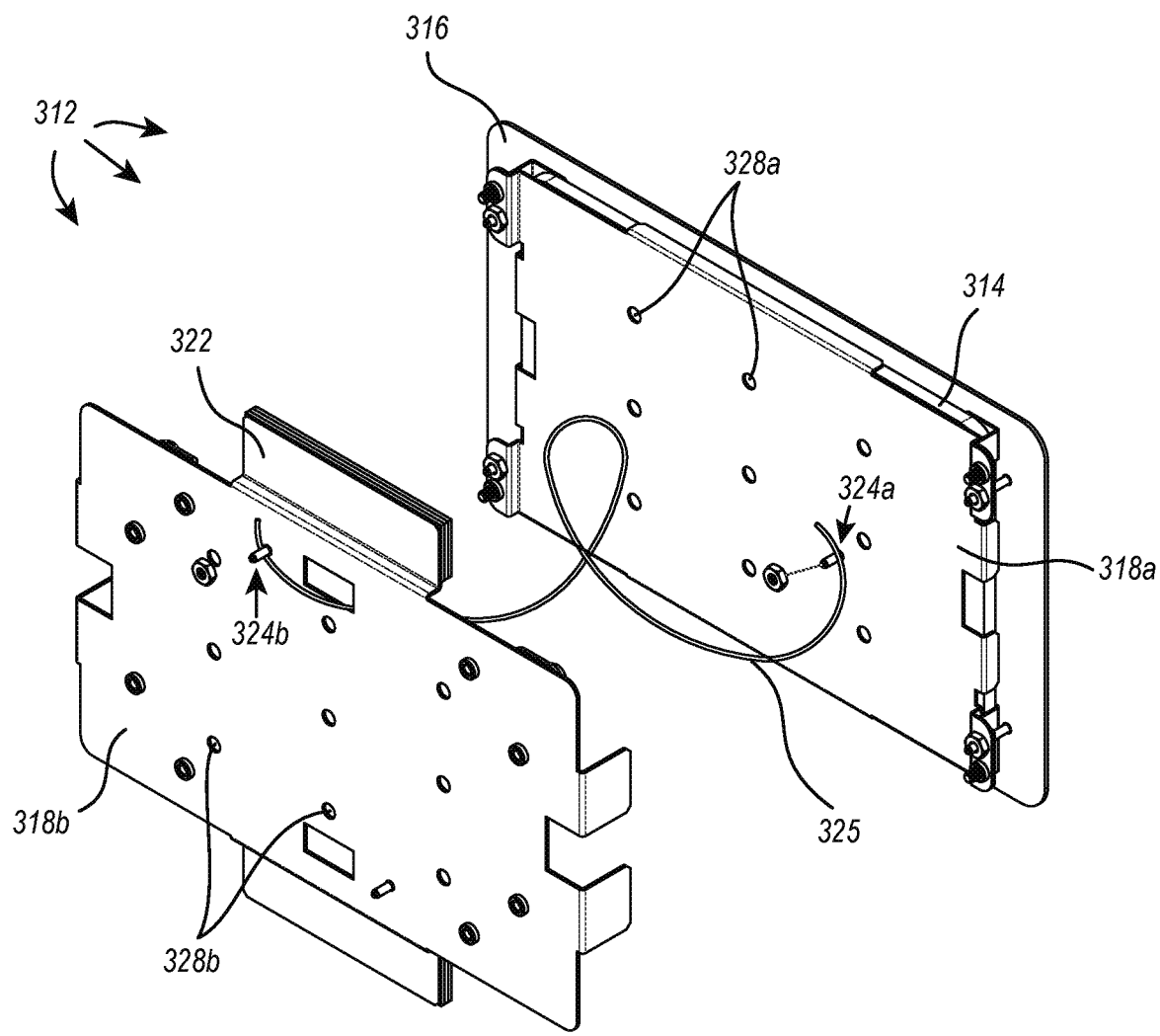
FIG. 8 illustrates a partially exploded rear perspective view of an exemplary mounting assembly having a selectively associated mounting plate and device dock.

In some implementations, it may be advantageous to have a mounting assembly 312 with an intermediate electronic device dock 318a, as shown in FIG. 8. A device dock 318a can be separable from the mounting plate 318b, allowing the user to deposit the electronic device 114 within the device dock 318a and associate a face plate 316 therewith and be able to do so without directly interacting with the modular wall. This can be advantageous because it allows a user to directly handle the device dock 318a and reposition it within space while securing the electronic device 314 and/or face plate 316 thereto. For example, in some implementations, the attachment mechanism used to associate the face plate with the remainder of the mounting assembly 312 may be a threaded bolt or similar attachment mechanism that includes a front and back facing portion. The mounting assembly 312 of FIG. 8 enables the functionality of manipulating attachment mechanisms for securing the face plate 316 and/or the electronic device 314 without needing access to the back side of the mounting plate 318b (or back side of the panel associated therewith).

In some implementations, the mounting assembly 312 is coupled to or otherwise associated with a tile or panel of a wall module. In some implementations, the mounting plate 318b is secured on one or more sides by the tile when the mounting plate 318b is connected to the modular wall. It should be appreciated that in some implementations, the mounting plate is similar to the mounting assembly described above such that the mounting plate can be bounded on all or less than all sides by the same tile or a plurality of tiles. Referring to the mounting plate 318b of FIG. 8, the mounting plate 318b includes a tile securing member 322 that acts to secure the mounting plate 318b to the back side of an associated tile. In some implementations, the tile securing member is coupled to the associated tile using an attachment mechanism, as described herein. In an exemplary implementation, the mounting plate is secured to the tile using a dual lock reclosable fastener.

In some implementations, the device dock 318a is selectively received into the mounting plate 318b using one or more connecting elements. In some embodiments, the connecting element includes a magnetic element that interacts with one or more portions of the face plate 316, electronic device 314, and/or device dock 318a. In some implementations, the device dock includes a complementary connecting element that interacts directly or indirectly with the connecting element disposed on the mounting plate. For example, the device dock can include a magnetic element or ferrous material that can interact with a magnetic element (or ferrous material if the device dock includes a magnetic element) on the mounting plate. In some implementations, a plurality of magnetic catches are secured to the mounting plate using, for example, a plurality of corresponding studs to mount the magnetic catches on a side of the mounting plate facing device dock. Additionally, or alternatively, the device dock is snappingly received into the mounting plate (e.g., by one or more spring clips, compression clips, interference fits, etc.).

As shown in FIG. 8, the mounting assembly 318 can additionally include a tether 325 connecting the device dock 318a with the mounting plate 318b. The tether 325 can be associated with the device dock 318a and mounting plate 318b using one or more securing elements 324a, 324b. The tether 325 can allow the device dock 318a to be temporarily disassociated from the mounting plate 318b but retained within a distance therefrom (i.e., the length of the tether). This can prevent, for example, the device dock 318a from being lost or misplaced with respect to the mounting plate 318b. It may additionally, or alternatively, act as a theft prevention measure. For example, the face plate may secure the electronic device within the device dock such that the electronic device cannot be removed therefrom without significant tampering or with some effort. By having the device dock tethered to the mounting assembly, even if the device dock is disassociated from the mounting plate, it is still connected to the modular wall.

The present invention may be embodied and/or implemented in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An electronic device mounting assembly for use in mounting an electronic device to a wall, the electronic device mounting assembly comprising:
    a mounting plate having a front surface and a receiving area, the receiving area being recessed from the front surface of the mounting plate and being configured to receive substantially all of an electronic device therein, the mounting plate being directly connectable to a wall;
    wherein the receiving area is stationary relative to the mounting plate, and comprises a single, fixed surface configured to receive and secure the electronic device, such that a rear surface of the electronic device is in direct contact with the single, fixed surface of the receiving area when the electronic device is secured thereto;
    one or more securing elements configured to selectively secure the electronic device within the receiving area of the mounting plate such that the electronic device is secured directly to the mounting plate, the one or more securing elements being connected to the mounting plate and extending from the mounting plate at least partially over the receiving area to selectively secure over a front face of the electronic device to retain the electronic device within the receiving area with the front face of the electronic device flush or substantially level with the front surface of the mounting plate; and
    a face plate selectively connectable directly to the mounting plate to cover at least a peripheral edge of the electronic device and a portion of the wall, the face plate being selectively connectable to the mounting plate with one or more attachment elements disposed on the front surface of the mounting plate adjacent to the one or more securing elements.

2. The electronic device mounting assembly of claim 1, wherein the one or more securing elements comprise one or more spring clips fixedly attached to a rear surface of the mounting plate and extending through one or more openings in the mounting plate.

3. The electronic device mounting assembly of claim 1, wherein the recess is sized and shaped to accommodate the electronic device such that the front face of the electronic device is flush or substantially level with the front surface of the mounting plate when secured by the one or more securing elements.

4. The electronic device mounting assembly of claim 1, wherein the one or more attachment elements comprise one or more magnetic elements attached to one or more of the mounting plate or the face plate.

5. The electronic device mounting assembly of claim 1, wherein the mounting plate comprises one or more openings to allow for air circulation.

6. The electronic device mounting assembly of claim 1, further comprising an electrical connector configured to provide one or more of power or data to the electronic device.

7. The electronic device mounting assembly of claim 1, wherein the wall comprises a modular wall, and wherein the mounting plate is connectable to a tile of the modular wall.

8. The electronic device mounting assembly of claim 7, wherein the electronic device mounting assembly is configured within and secured on all sides by the tile when the mounting plate is connected to the modular wall.

9. A wall module, comprising:
one or more vertical brackets;
one or more horizontal support members connected to the one or more vertical brackets;
one or more tiles connected to the one or more vertical brackets and/or one or more horizontal support members, at least one tile of the one or more tiles having an opening formed therein; and
an electronic device mounting assembly connected to the at least one tile at the opening, the electronic device mounting assembly comprising:
  a mounting plate having a front surface and a receiving area configured to have an electronic device mounted directly therein, the receiving area being recessed from the front surface of the mounting plate and being configured to receive substantially all of an electronic device therein, the mounting plate being disposed in the opening in the tile and the recess being sized to accommodate the electronic device such that a front face of the electronic device is flush or substantially level with the front surface of the mounting plate and a front surface of the tile;
  wherein the receiving area is stationary relative to the mounting plate, and comprises a single, fixed surface configured to receive and secure the electronic device, such that a rear surface of the electronic device is in direct contact with the single, fixed surface of the receiving area when the electronic device is secured thereto;
  one or more securing elements configured to selectively secure the electronic device within the receiving area, the one or more securing elements comprising one or more spring clips connected to the mounting plate and extending from the mounting plate into the receiving area to selectively secure over a front face of the electronic device to retain the electronic device within the receiving area with the front face of the electronic device flush or substantially level with the front surface of the mounting plate; and
  a face plate selectively connected directly to the mounting plate and configured to cover an edge of the opening in the at least one tile and a peripheral edge of the electronic device, the face plate being selectively connectable to the mounting plate with one or more attachment elements disposed on the front surface of the mounting plate adjacent to the one or more securing elements.

10. The wall module of claim 9, wherein the electronic device mounting assembly is configured within and secured on all sides by the same tile.

11. The wall module of claim 9, wherein the mounting plate is secured to a rear surface of the least one tile.

12. The wall module of claim 9, wherein the face plate is selectively securable to the mounting plate using magnetic elements attached to the mounting plate and/or the face plate.

13. The wall module of claim 9, wherein the face plate is sized and shaped to accommodate a size of the electronic device or to selectively display a portion of the electronic device.

14. The wall module of claim 9, further comprising an electrical connector configured to provide one or more of power or data to the electronic device.

15. An electronic device mounting assembly for use in mounting an electronic device to a wall, the electronic device mounting assembly comprising:
a mounting plate configured to selectively receive and secure a device dock, the mounting plate being connectable to a wall;
the device dock having a front surface and a receiving area, the receiving area being recessed from the front surface of the device dock and configured to receive substantially all of an electronic device therein, such that a front surface of the electronic device is flush with the front surface of the device dock, the device dock being selectively and directly mountable to the mounting plate;
wherein the receiving area is stationary relative to the device dock, and comprises a single, fixed surface configured to receive and secure the electronic device;
one or more connecting elements configured to selectively secure the device dock to the mounting plate, such that the device dock is stationary when secured to the mounting plate, the device dock being completely separable from the mounting plate, wherein the device dock is selectively removable from the mounting plate via the one or more connecting elements;
one or more securing elements configured to selectively secure the electronic device within the receiving area of the device dock; and
a face plate selectively connectable directly to the device dock to cover at least a peripheral edge of the electronic device and a portion of the wall.

16. The electronic device mounting assembly of claim 15, further comprising a tether connected between the mounting plate and the device dock, the tether being configured to constrain movement of the device dock relative to the mounting plate when the device dock is selectively removed from the mounting plate.

17. The electronic device mounting assembly of claim 15, wherein the mounting plate and the device dock each comprise one or more openings to allow for air circulation.

18. The electronic device mounting assembly of claim 15, wherein the device dock is configured to have an electronic device mounted within the receiving area of the device dock when the device dock is separated from the mounting plate.

* * * * *